(12) United States Patent
Bae et al.

(10) Patent No.: US 10,690,984 B2
(45) Date of Patent: Jun. 23, 2020

(54) ELECTRONIC APPARATUS AND CONTROL METHOD THEREOF

(71) Applicant: SAMSUNG ELECTRONICS CO., LTD., Suwon-si, Gyeonggi-do (KR)

(72) Inventors: Jun Cheol Bae, Suwon-si (KR); Chul Baik, Suwon-si (KR); Hong Suk Kim, Seoul (KR); Byung Hwa Seo, Seongnam-si (KR); Hyun Min Song, Suwon-si (KR); Tatsuhiro Otsuka, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 15/780,025

(22) PCT Filed: Nov. 8, 2016

(86) PCT No.: PCT/KR2016/012797
§ 371 (c)(1),
(2) Date: May 30, 2018

(87) PCT Pub. No.: WO2017/095037
PCT Pub. Date: Jun. 8, 2017

(65) Prior Publication Data
US 2018/0364504 A1    Dec. 20, 2018

(30) Foreign Application Priority Data
Nov. 30, 2015    (KR) .................. 10-2015-0168882

(51) Int. Cl.
*G02F 1/163* (2006.01)
*G02F 1/137* (2006.01)
(Continued)

(52) U.S. Cl.
CPC .......... *G02F 1/137* (2013.01); *G02F 1/13476* (2013.01); *G02F 1/133308* (2013.01);
(Continued)

(58) Field of Classification Search
CPC .......................... G02F 4/137; G02F 1/133308
(Continued)

(56) References Cited

U.S. PATENT DOCUMENTS

2003/0017856 A1* 1/2003 Kotchick .......... G02F 1/133528
455/566
2009/0096942 A1   4/2009 Schneider et al.
(Continued)

FOREIGN PATENT DOCUMENTS

KR    10-2007-0068890    7/2007
KR    10-2014-0067487    6/2014
(Continued)

OTHER PUBLICATIONS

Extended European Search Report dated Sep. 27, 2018 in European Patent Application No. 16870933.5.
(Continued)

*Primary Examiner* — Calvin C Ma
(74) *Attorney, Agent, or Firm* — Staas & Halsey LLP

(57) ABSTRACT

One aspect of the present invention is to provide an electronic apparatus which is configured to provide a color writing function by means of the physical force of an external input means, and a control method thereof. More particularly, the present invention is to provide an electronic apparatus equipped with a plurality of liquid crystal panels in an electronic apparatus so that a plurality of colors can be written by the physical force of an external input means, and a control method thereof.

15 Claims, 47 Drawing Sheets

(51) Int. Cl.
*G06F 3/0488* (2013.01)
*G02F 1/1333* (2006.01)
*G02F 1/1347* (2006.01)
*G06F 3/041* (2006.01)

(52) U.S. Cl.
CPC .............. *G02F 1/163* (2013.01); *G06F 3/041* (2013.01); *G06F 3/0488* (2013.01)

(58) Field of Classification Search
USPC .................................................. 345/74, 104
See application file for complete search history.

(56) References Cited

U.S. PATENT DOCUMENTS

| | | | |
|---|---|---|---|
| 2010/0245221 A1 | 9/2010 | Khan | |
| 2010/0312625 A1* | 12/2010 | Miller | A63F 1/02 705/14.5 |
| 2012/0105370 A1* | 5/2012 | Moore | G06F 3/0412 345/174 |
| 2014/0232960 A1 | 8/2014 | Schwartz et al. | |
| 2014/0306903 A1 | 10/2014 | Huang et al. | |

FOREIGN PATENT DOCUMENTS

| | | |
|---|---|---|
| KR | 10-2014-0085466 | 7/2014 |
| KR | 10-2015-0114314 | 10/2015 |

OTHER PUBLICATIONS

International Search Report dated Feb. 16, 2017 in corresponding International Patent Application No. PCT/KR2016/012797.
Written Opinion of the International Searching Authority dated Feb. 16, 2017 in corresponding International Patent Application No. PCT/KR2016/012797.

* cited by examiner

【Fig. 1】
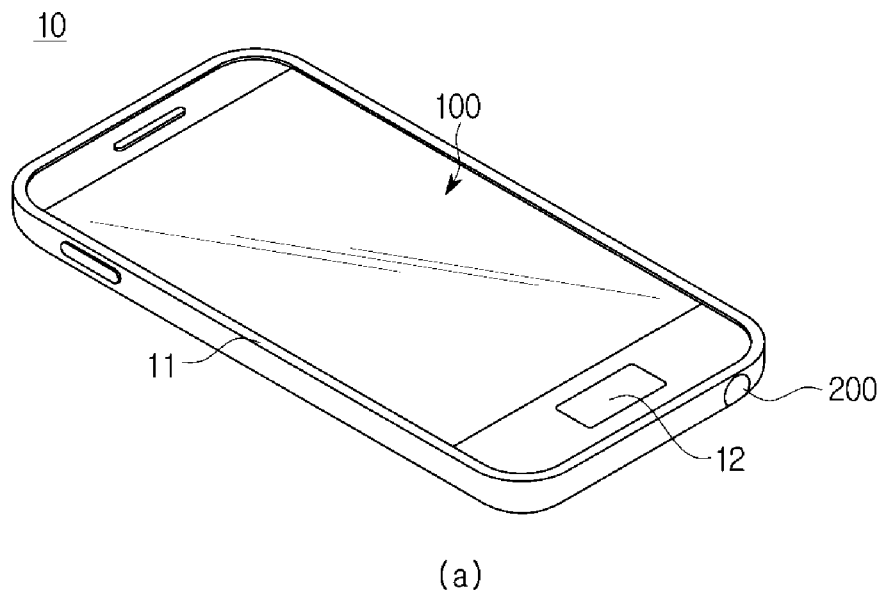
(a)
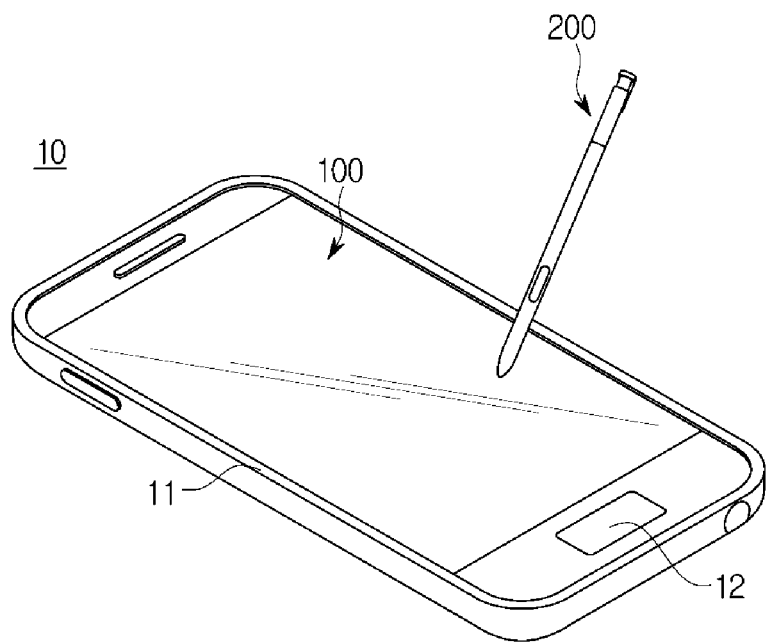
(b)

[Fig. 2]
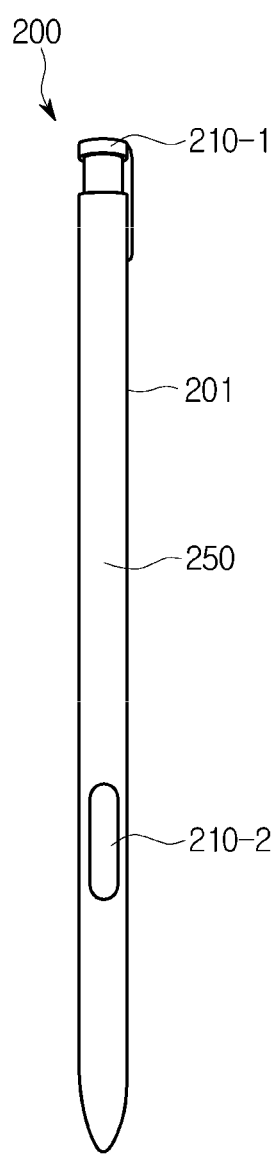

[Fig. 3]
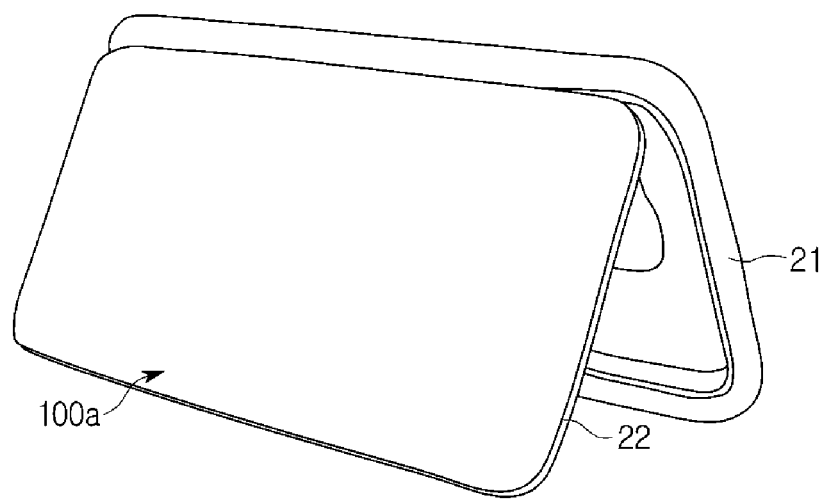

【Fig. 4】
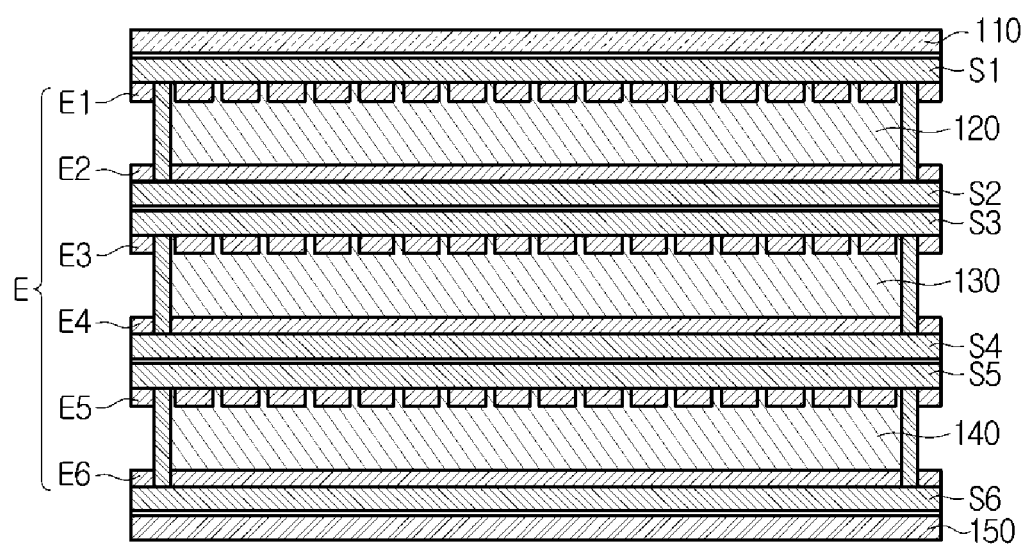

[Fig. 5]
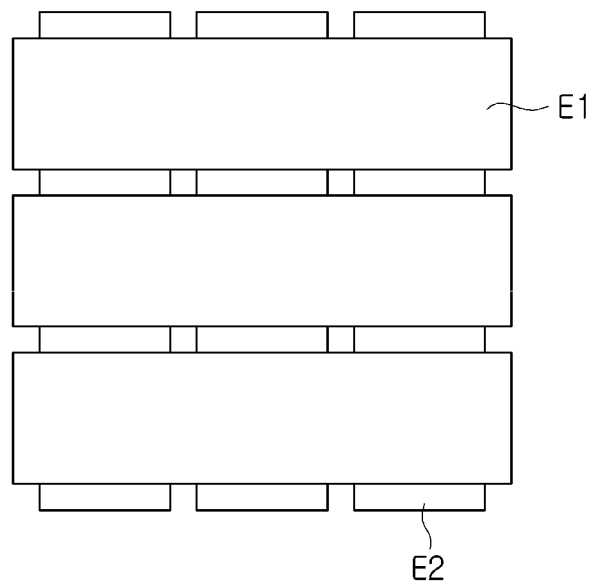

[Fig. 6]
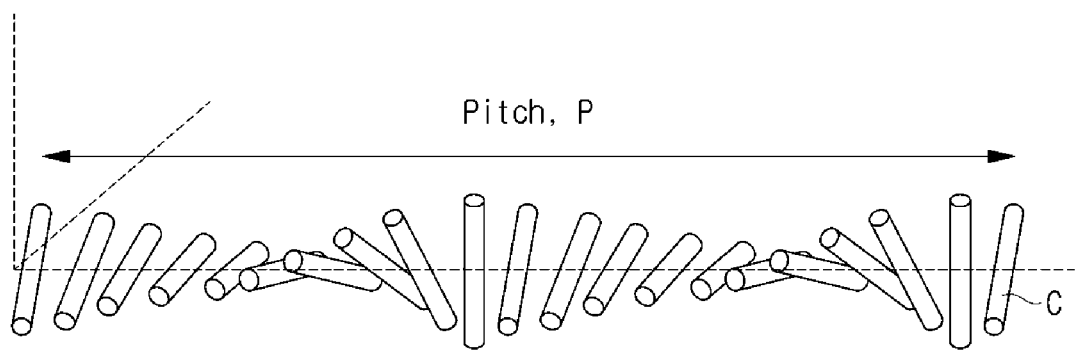

[Fig. 7]
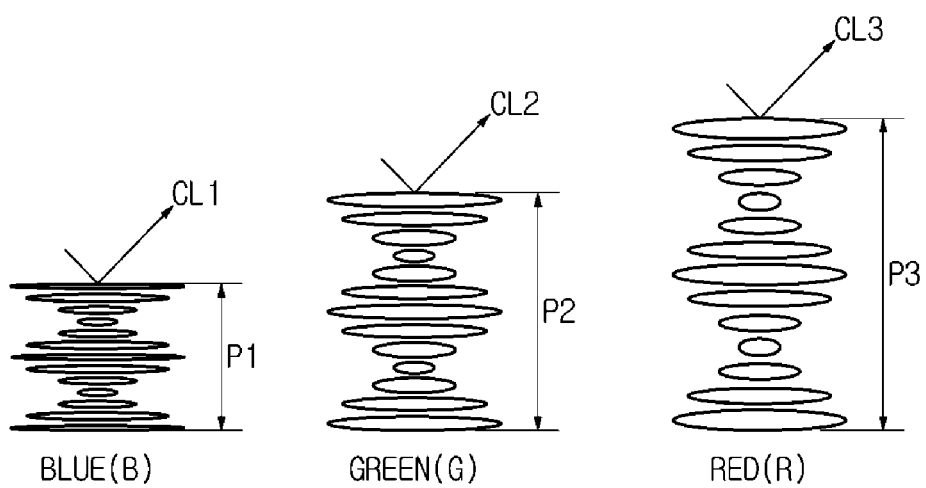

[Fig. 8]
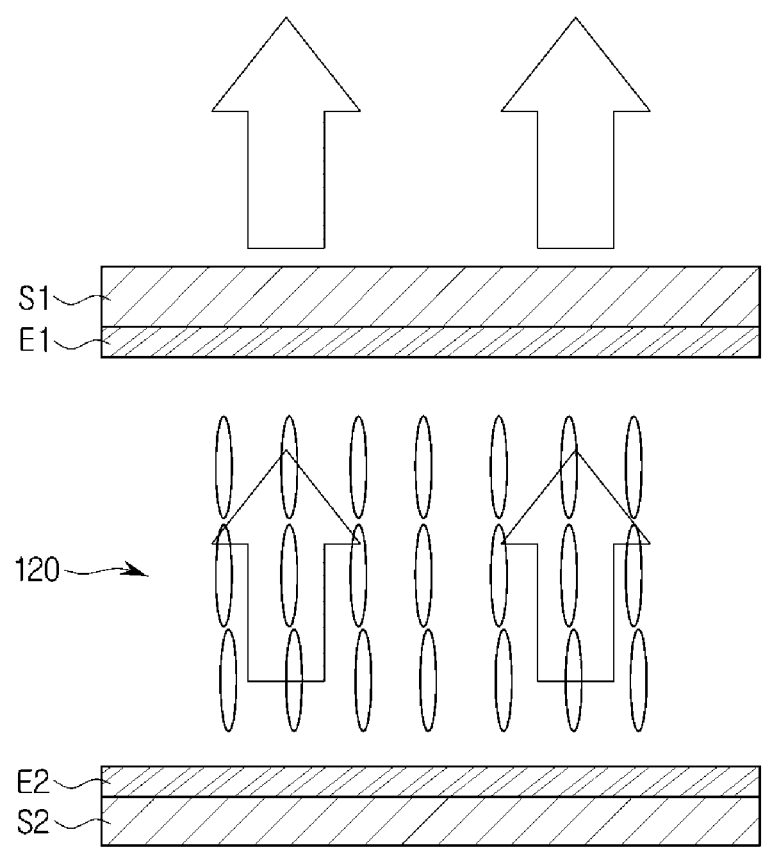

[Fig. 9]
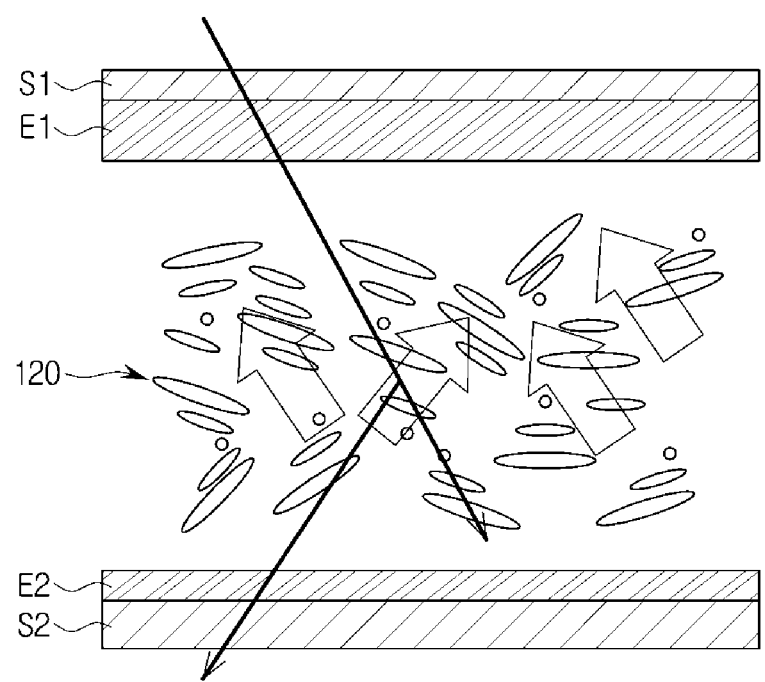

[Fig. 10]
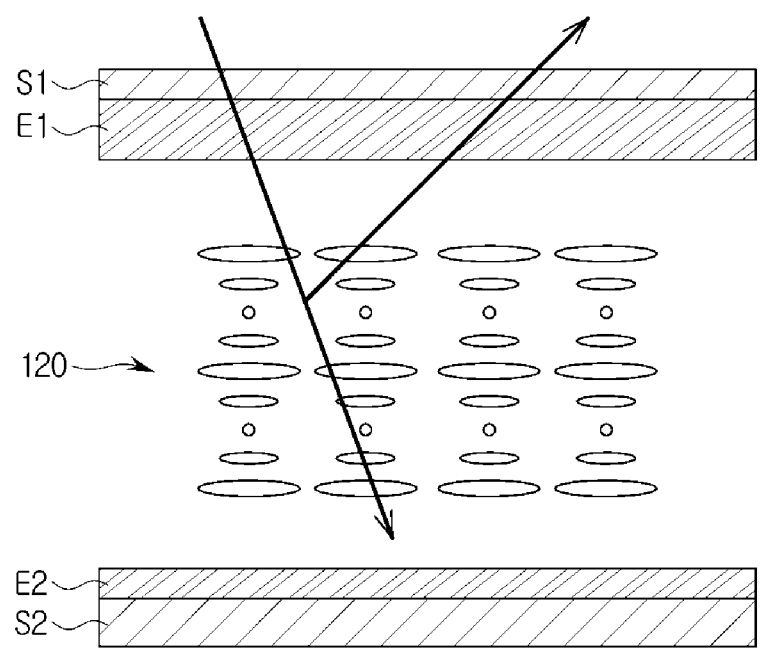

[Fig. 11]
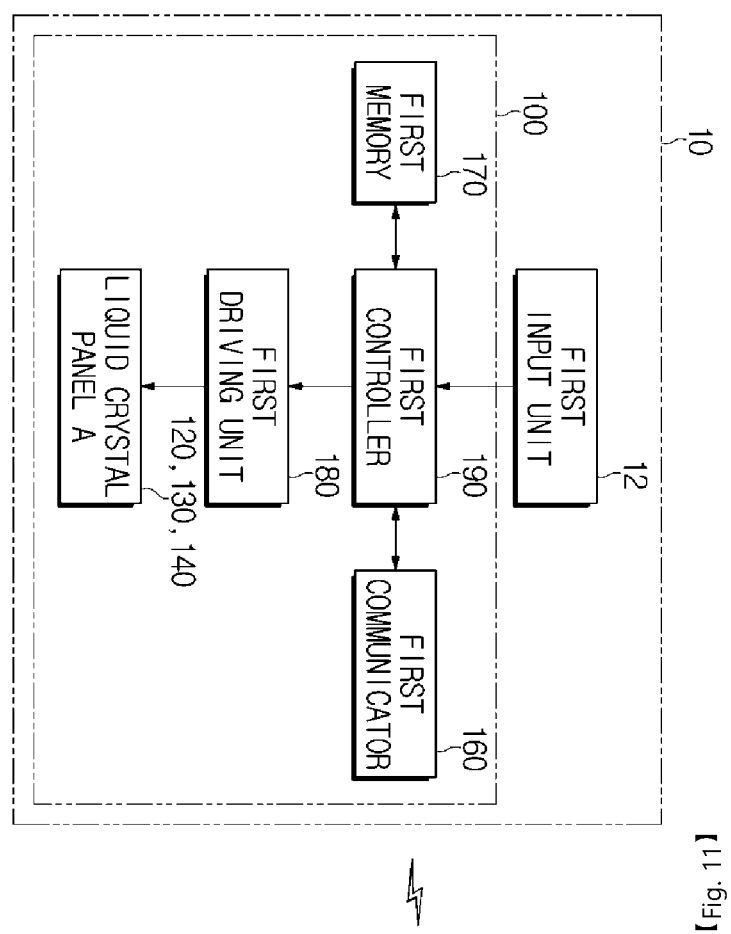
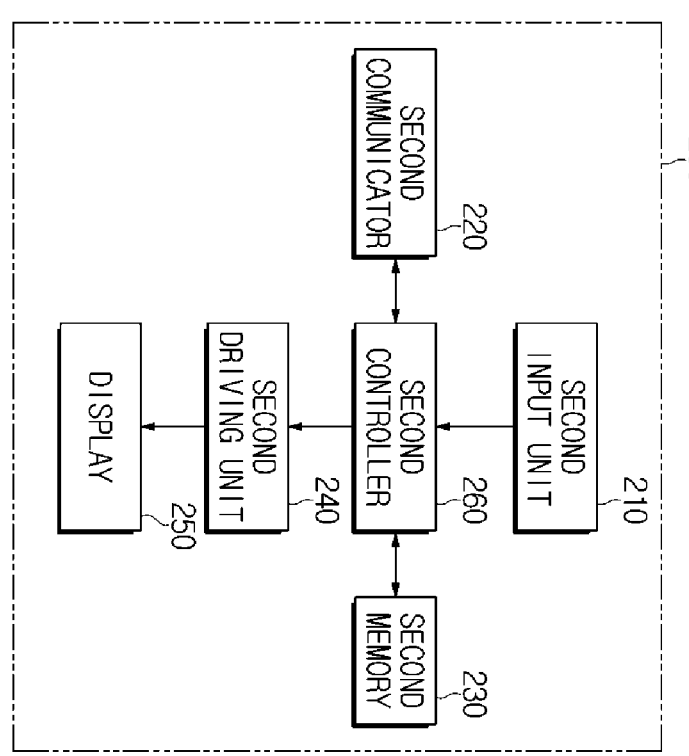

[Fig. 12]
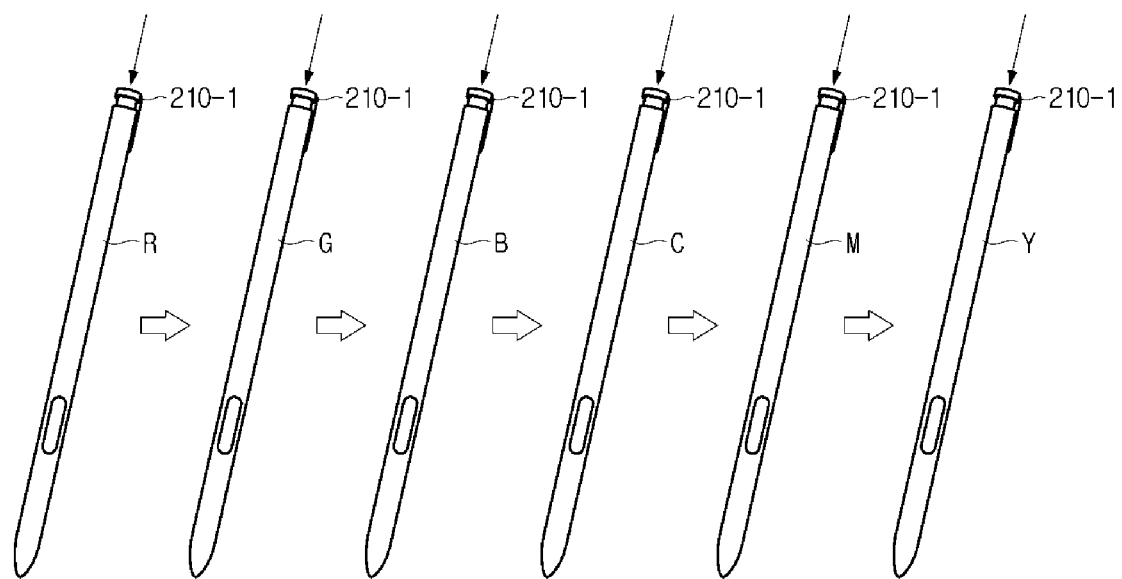

【Fig. 13】
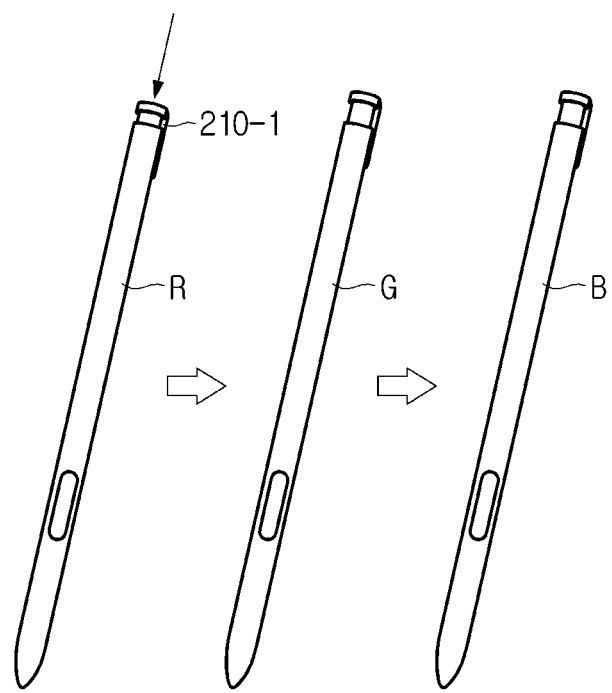

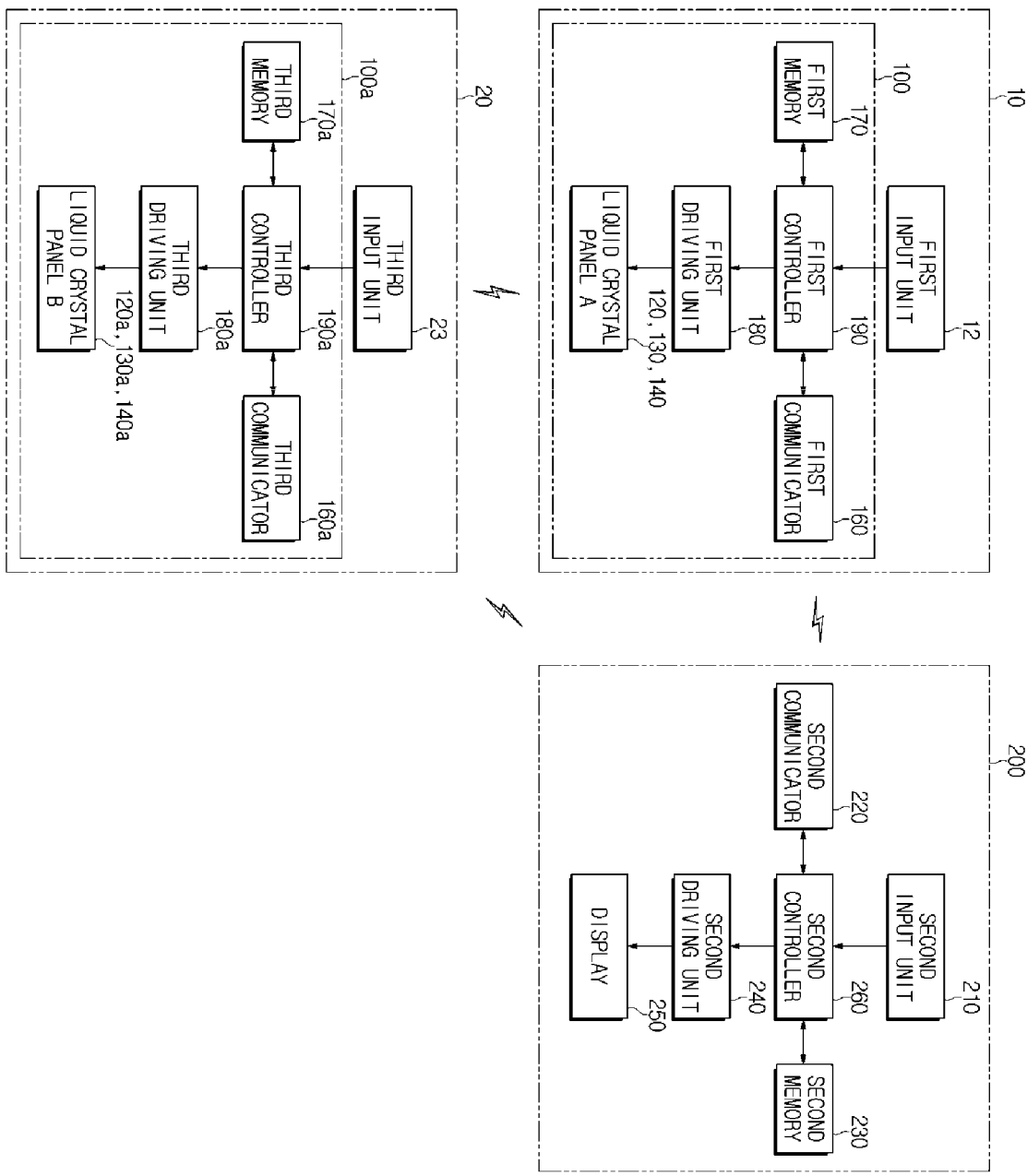

【Fig. 15】
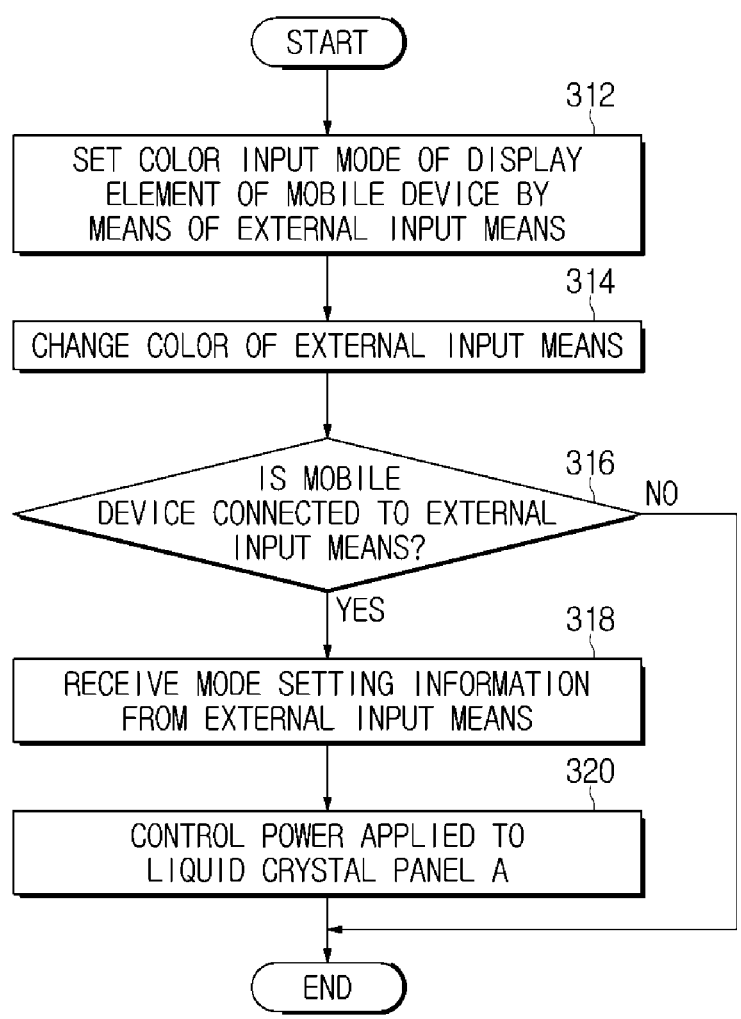

[Fig. 16]
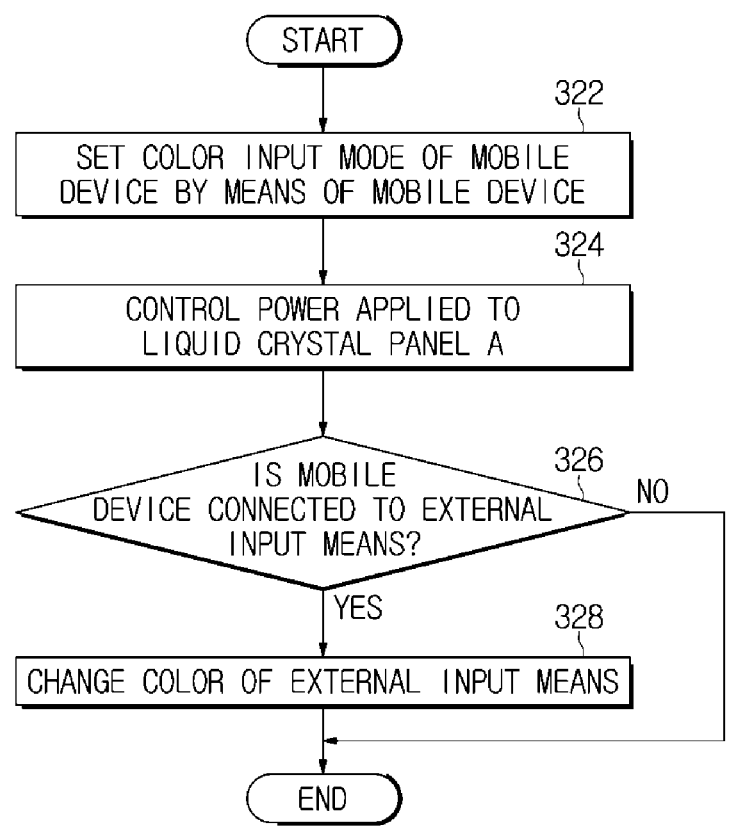

[Fig. 17]
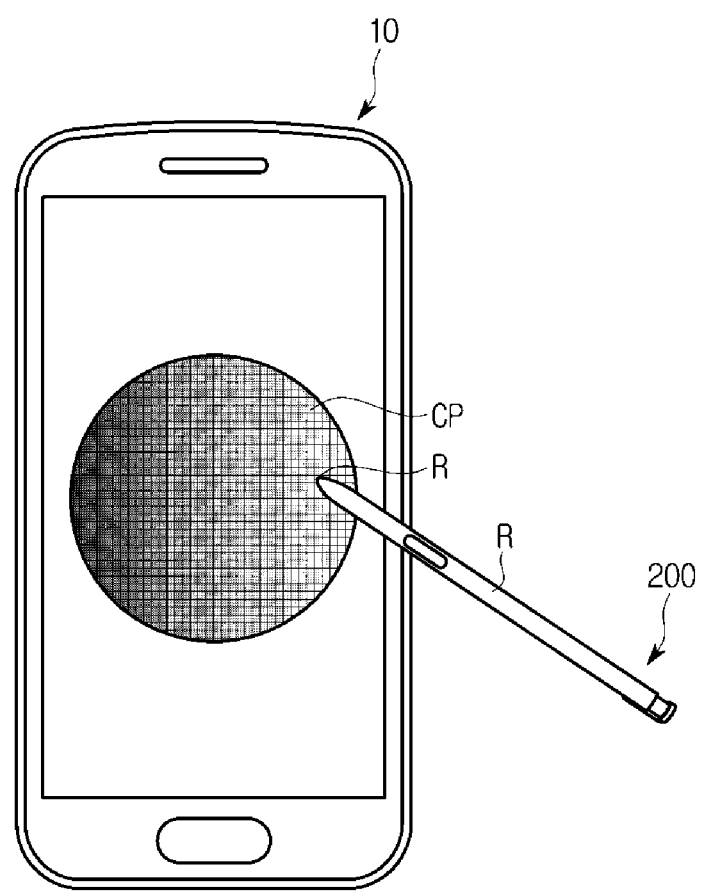

[Fig. 18]

| | RED(R) | GREEN(R) | BLUE(R) | CYAN(C) | MAGENTA(M) | YELLOW(Y) | BLACK(K) | WHITE(W) |
|---|---|---|---|---|---|---|---|---|
| FIRST LIQUID CRYSTAL PANEL (B) | ON | ON | OFF | OFF | OFF | ON | ON | OFF |
| SECOND LIQUID CRYSTAL PANEL (G) | ON | OFF | ON | OFF | ON | OFF | ON | OFF |
| THIRD LIQUID CRYSTAL PANEL (R) | OFF | ON | ON | ON | OFF | OFF | ON | OFF |

[Fig. 19]
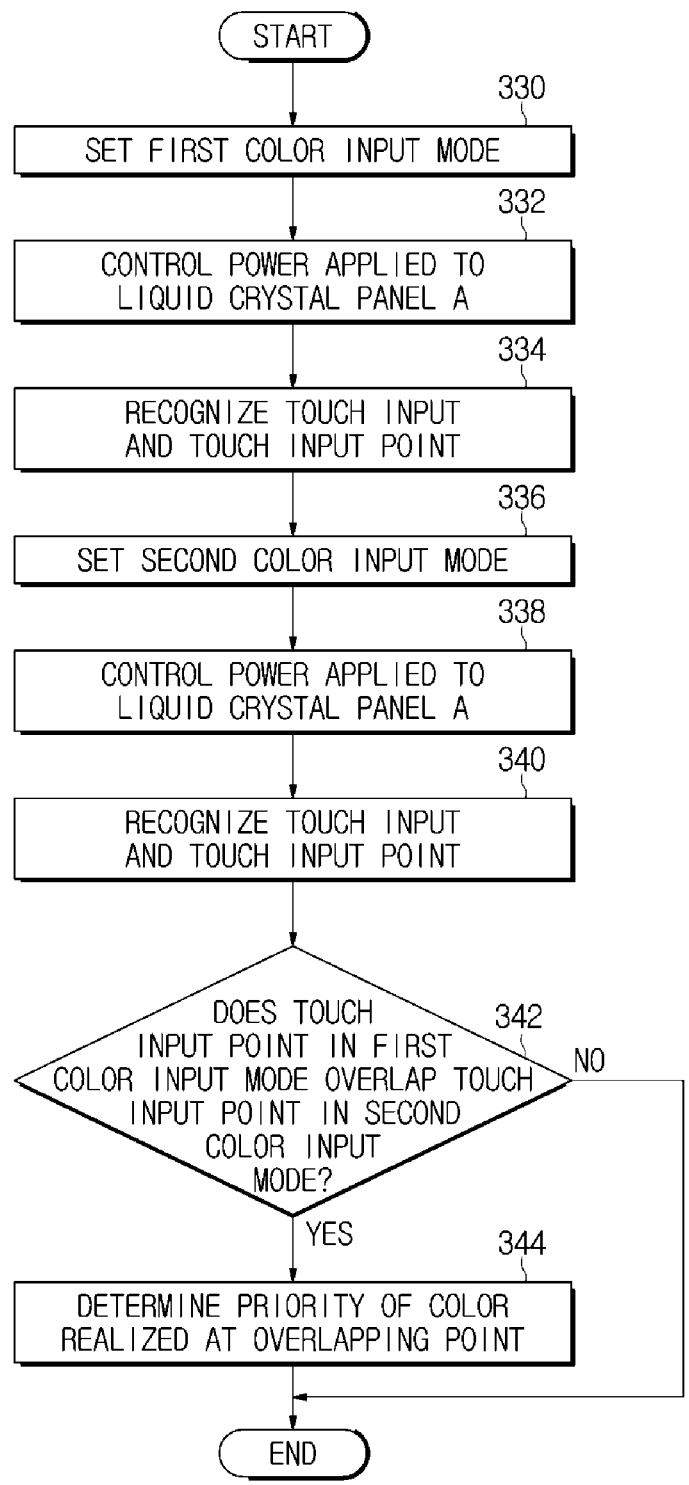

【Fig. 20】
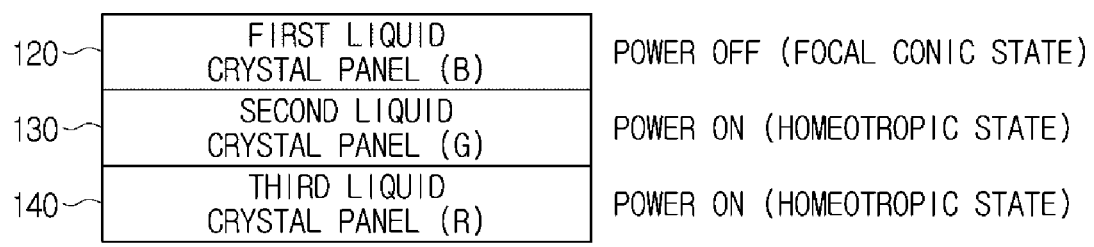

【Fig. 21】
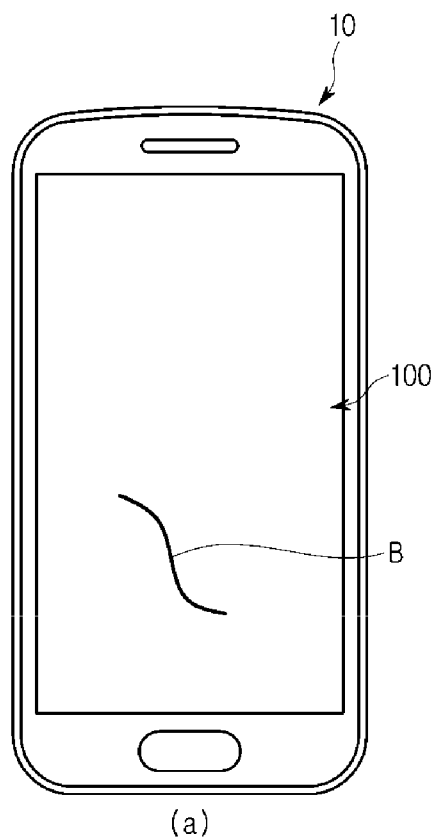

[Fig. 22]

| 120 — | FIRST LIQUID CRYSTAL PANEL (B) | POWER ON/OFF (HOMEOTROPIC & PLANAR STATE) |
| 130 — | SECOND LIQUID CRYSTAL PANEL (G) | POWER OFF (FOCAL CONIC STATE) |
| 140 — | THIRD LIQUID CRYSTAL PANEL (R) | POWER ON (HOMEOTROPIC STATE) |

【Fig. 23】
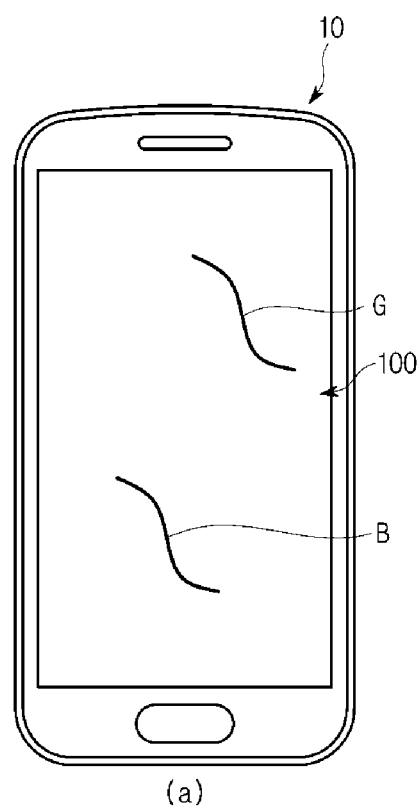
(a)
| 120 — | FIRST LIQUID CRYSTAL PANEL (B) | POWER ON/OFF (HOMEOTROPIC & PLANAR STATE) |
| 130 — | SECOND LIQUID CRYSTAL PANEL (G) | POWER OFF (FOCAL CONIC STATE) |
| 140 — | THIRD LIQUID CRYSTAL PANEL (R) | POWER ON (HOMEOTROPIC STATE) |
(b)

[Fig. 24]
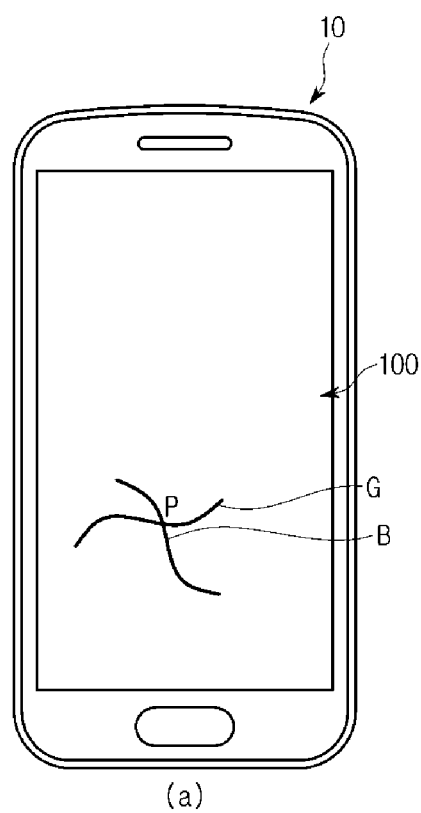
(a)
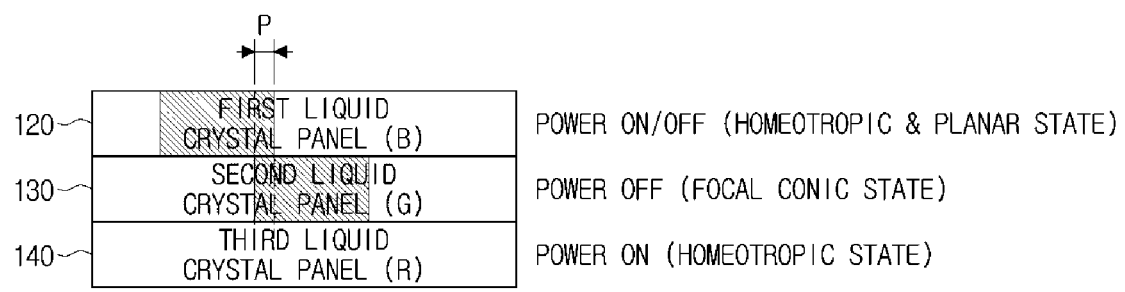
(b)

[Fig. 25]
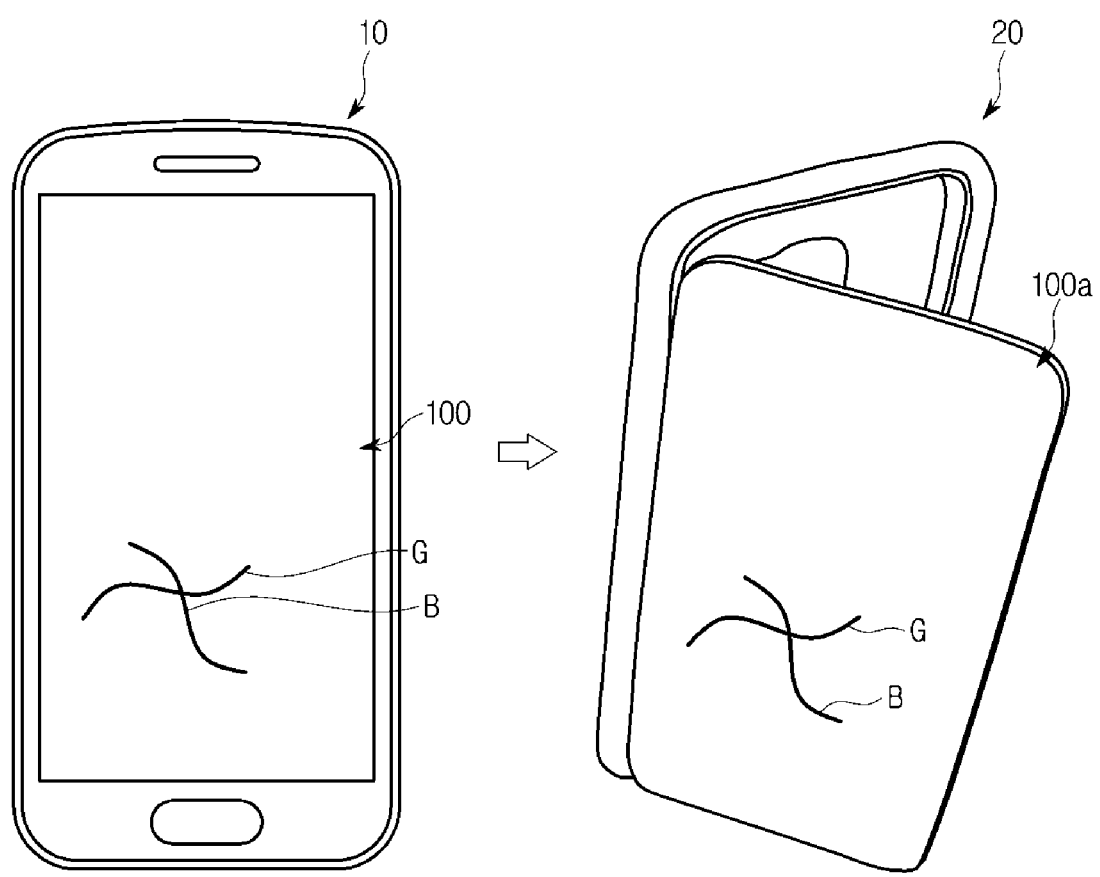

[Fig. 26]
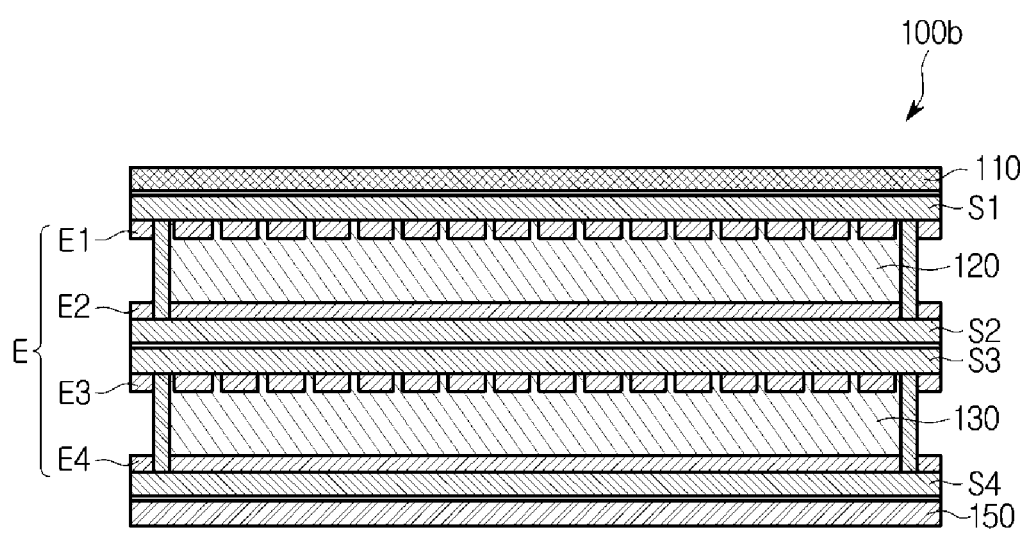

[Fig. 27]
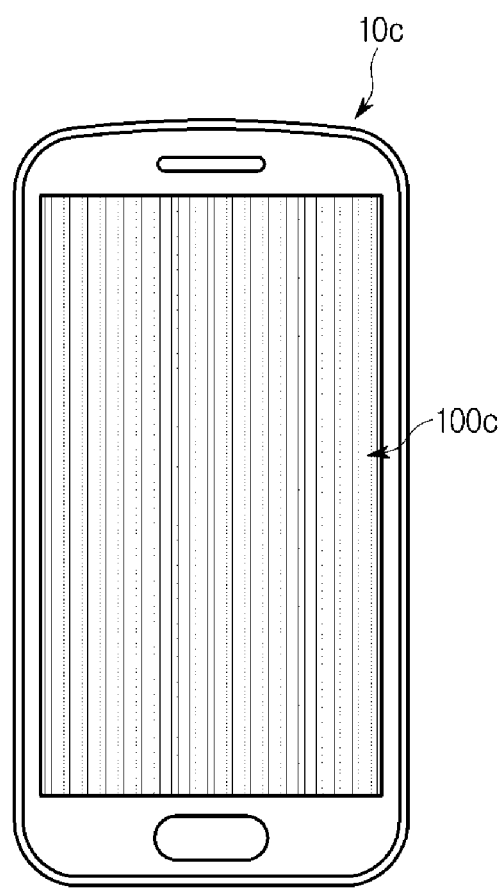

[Fig. 28]
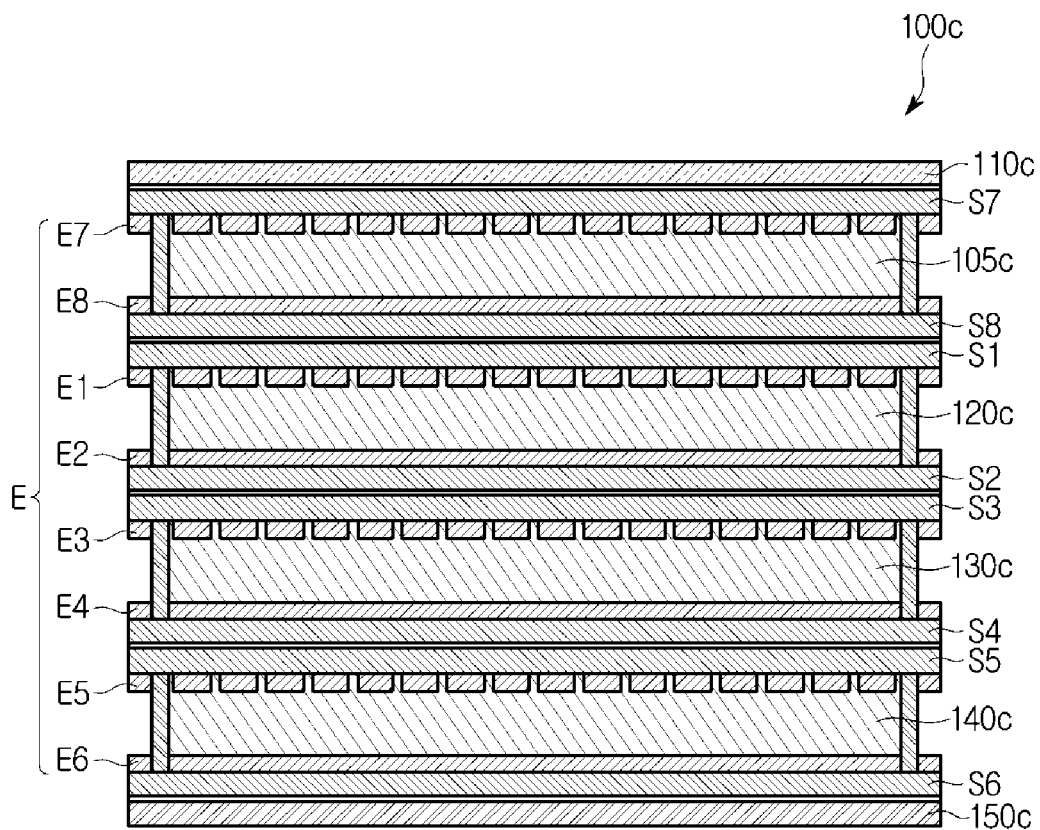

[Fig. 29]
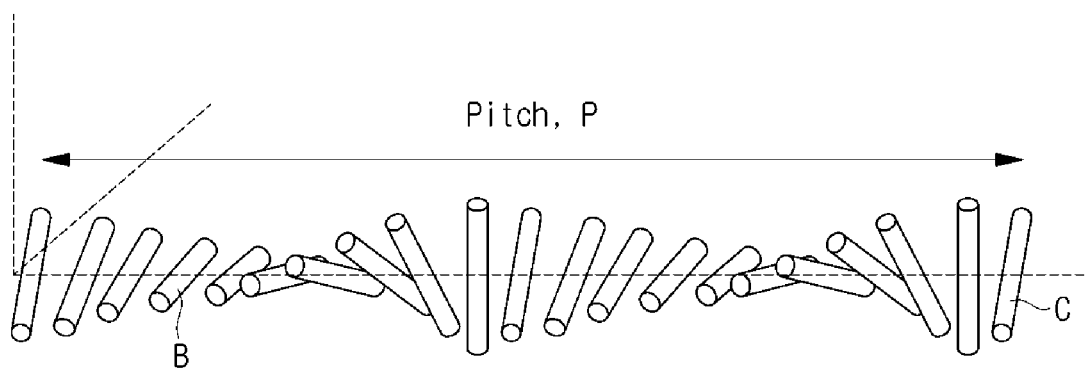

[Fig. 30]
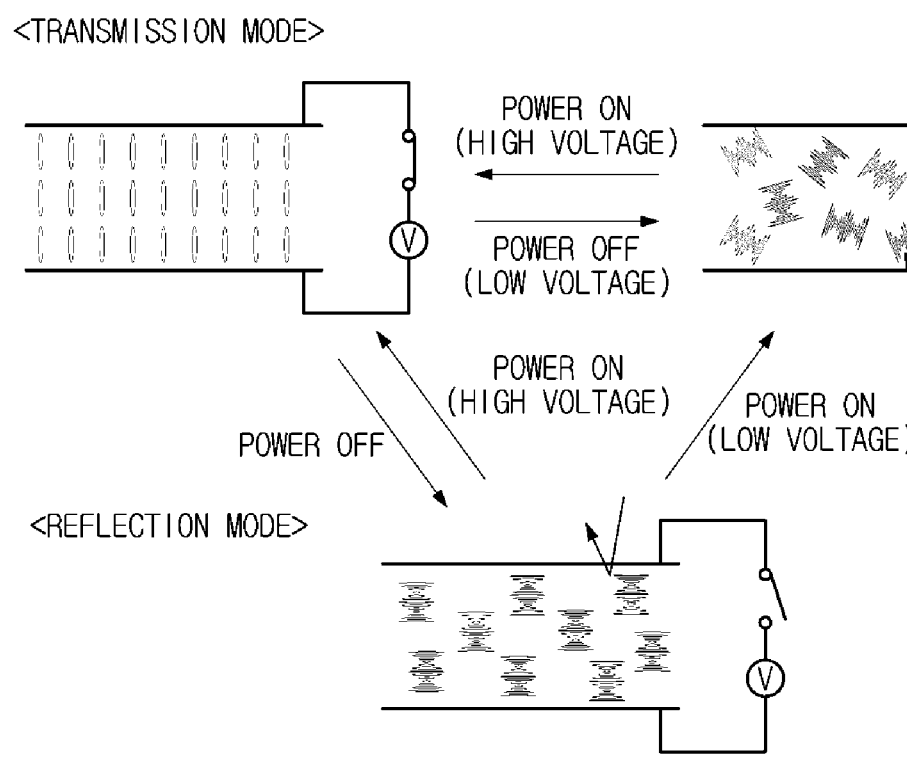

[Fig. 31]
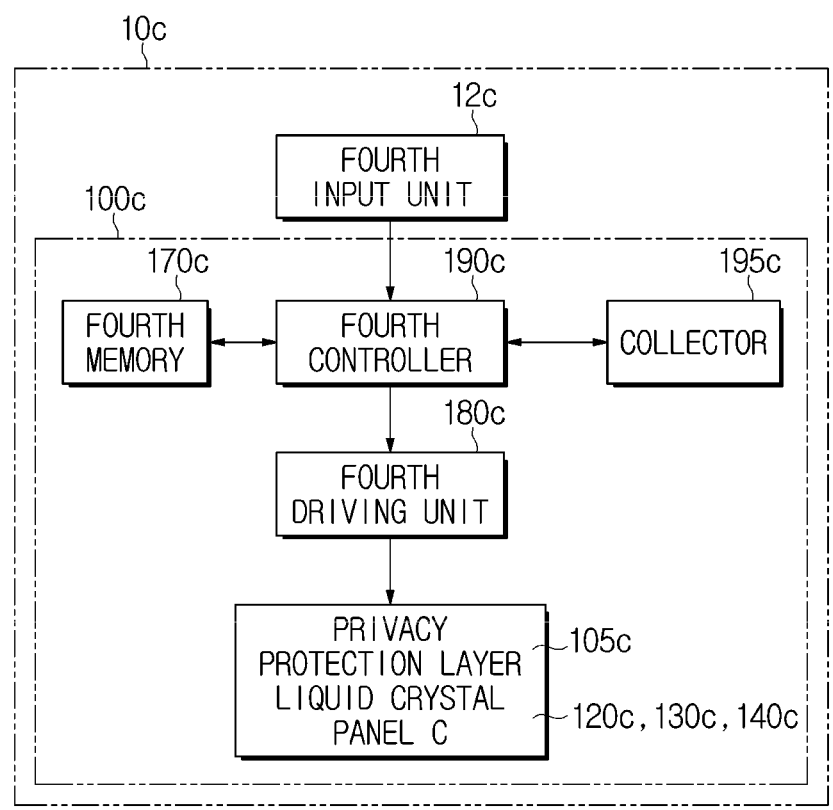

【Fig. 32】
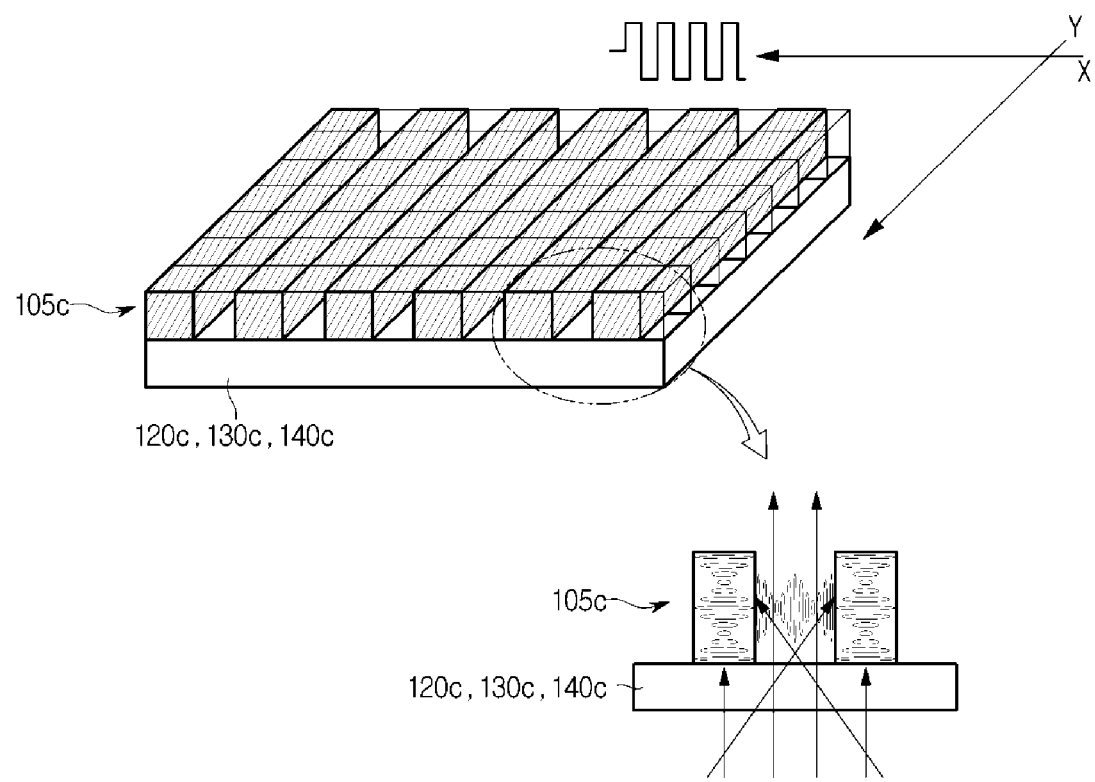

[Fig. 33]
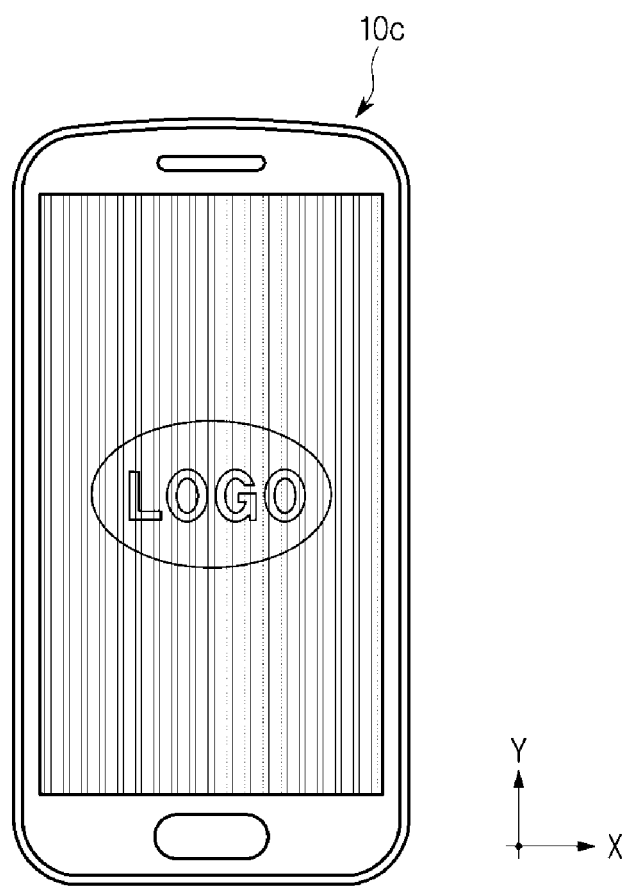

【Fig. 34】
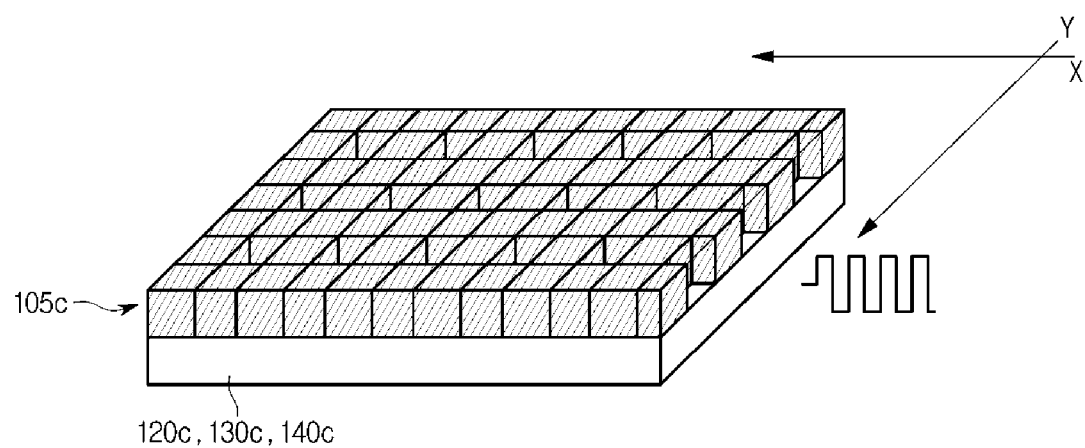

[Fig. 35]
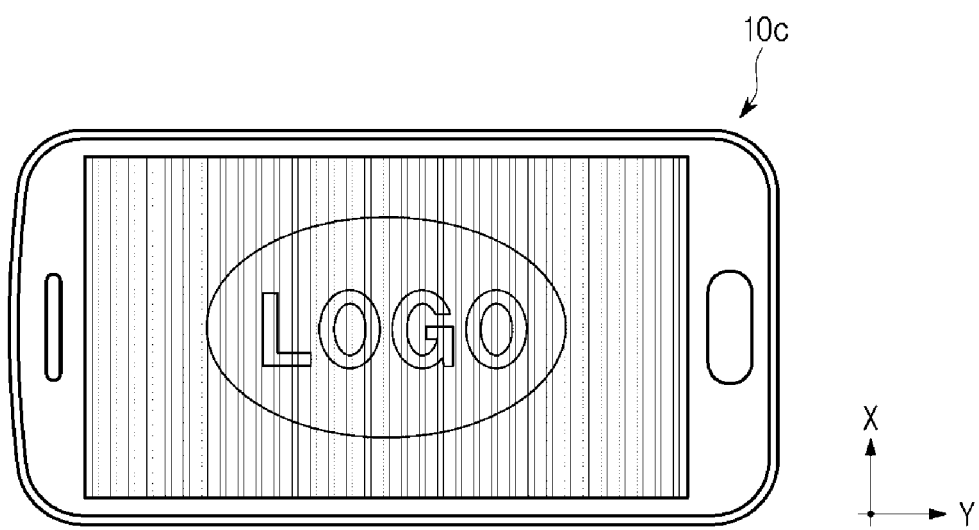

[Fig. 36]
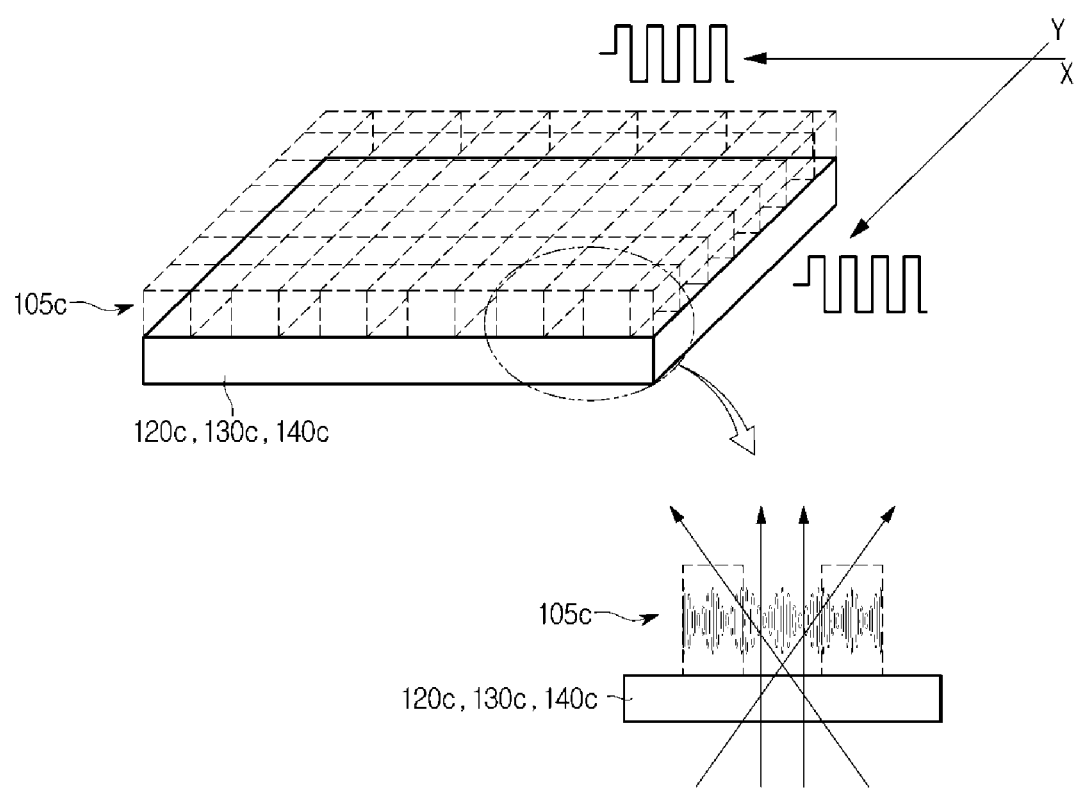

[Fig. 37]
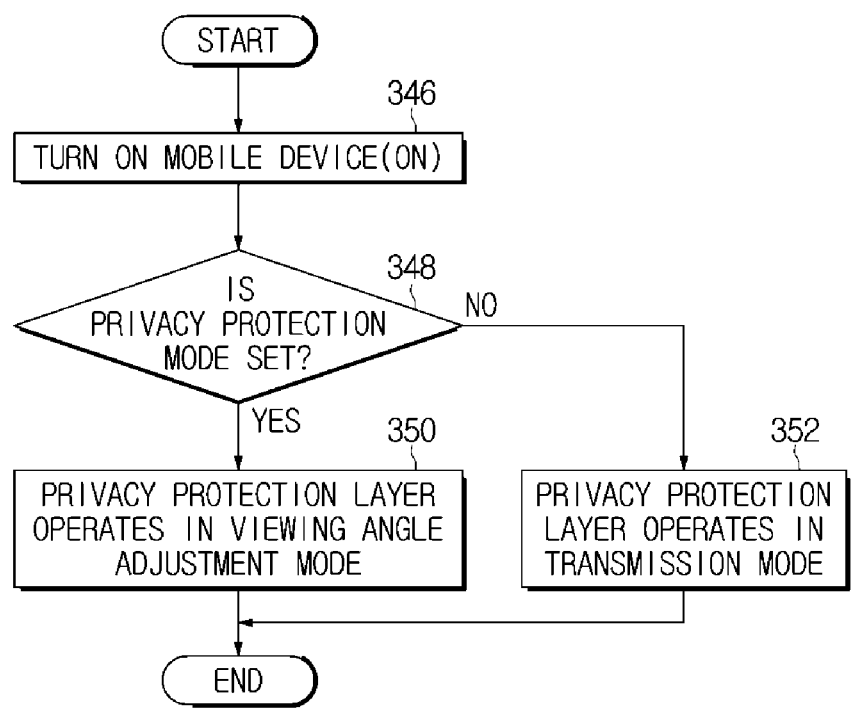

[Fig. 38]
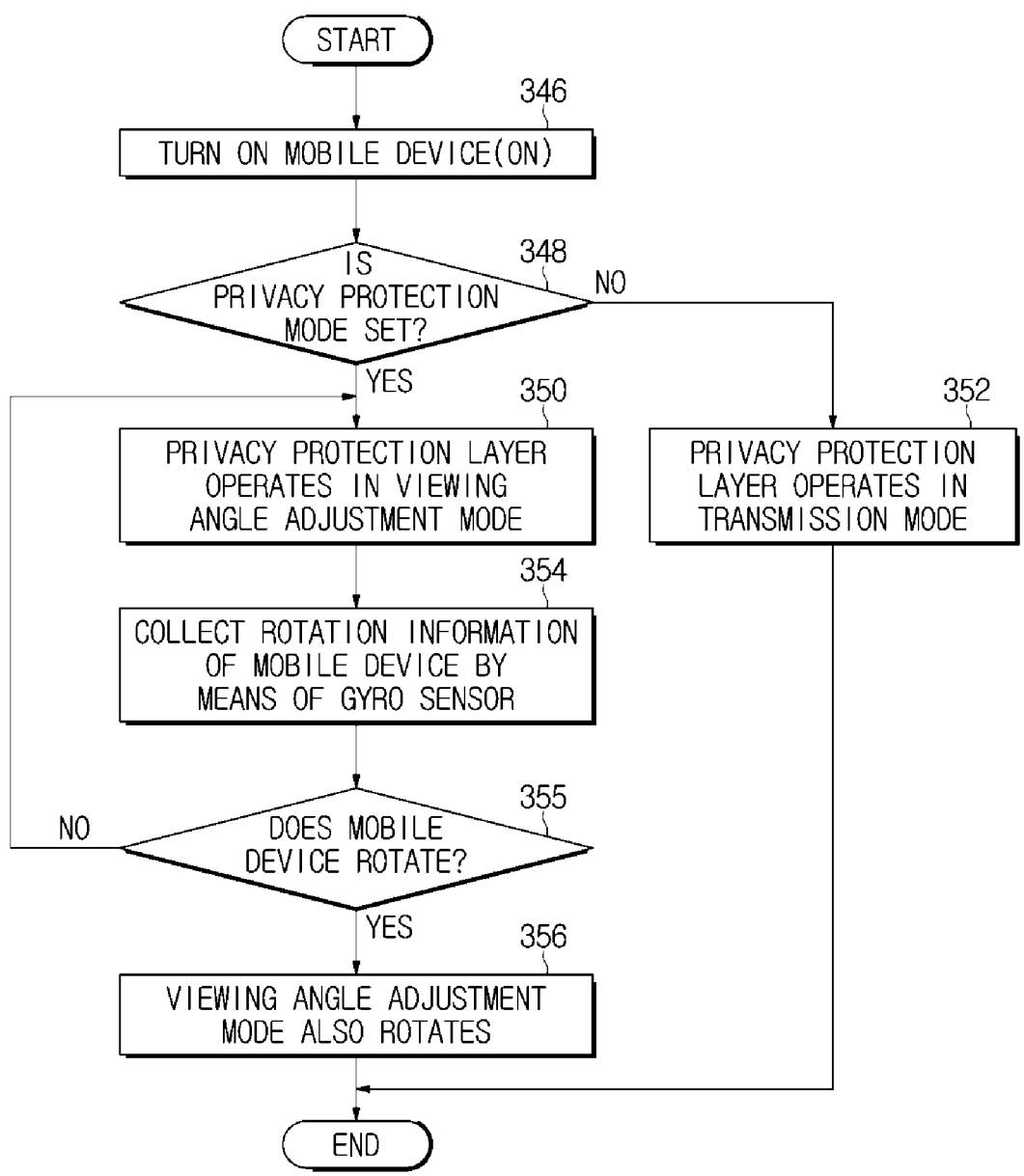

[Fig. 39]
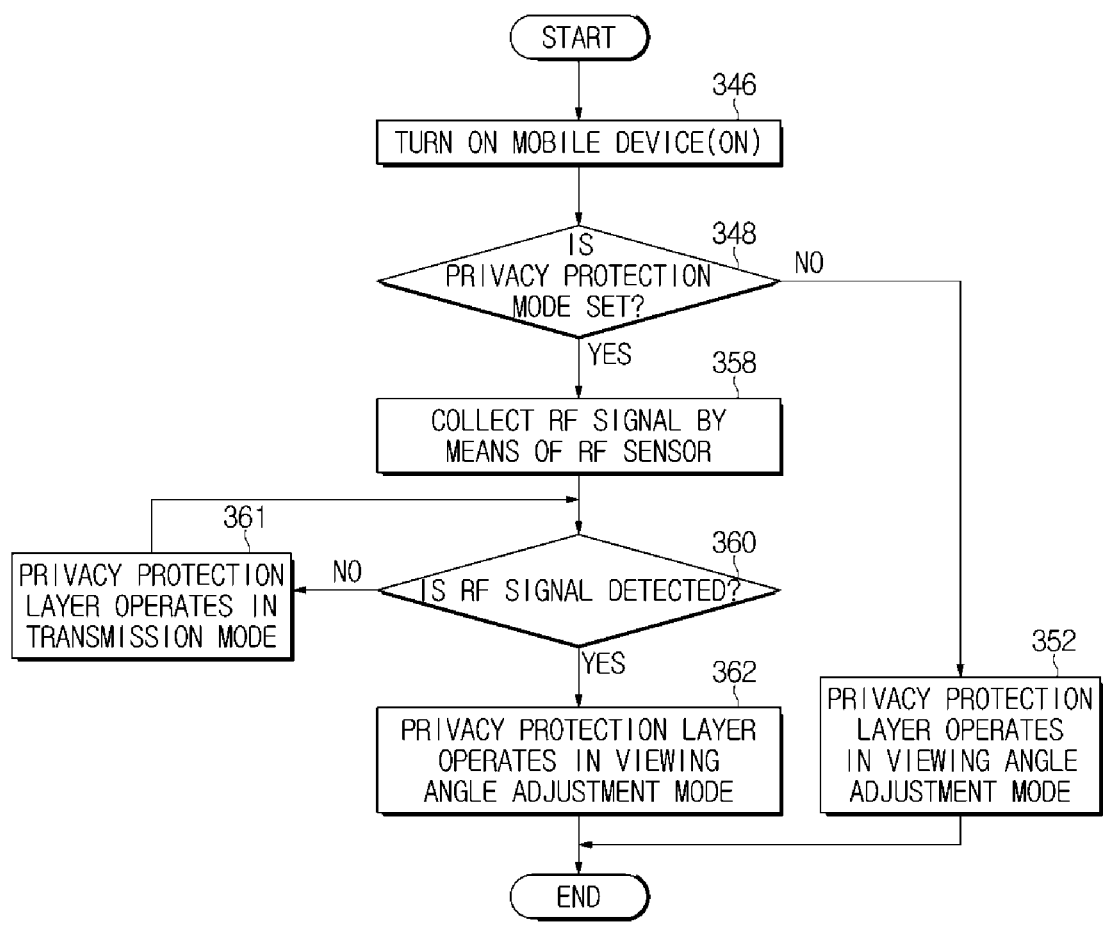

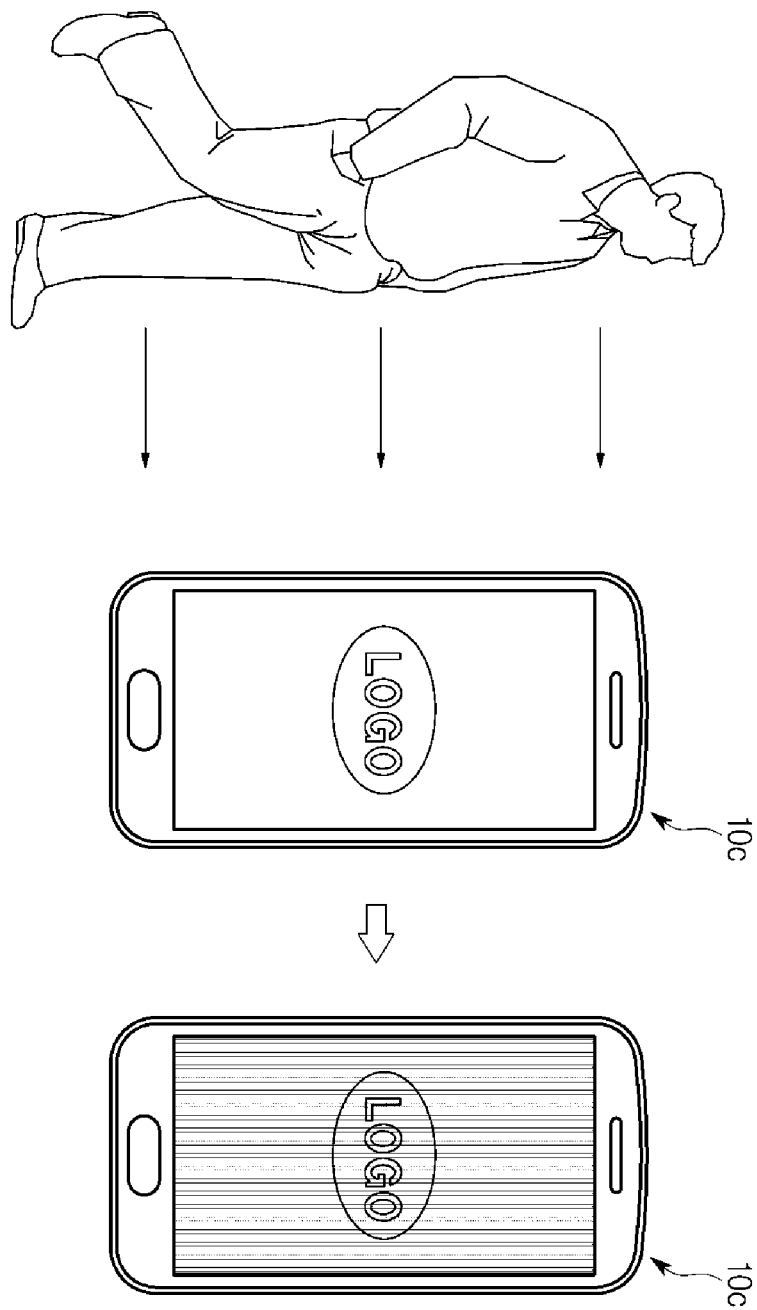
[Fig. 40]

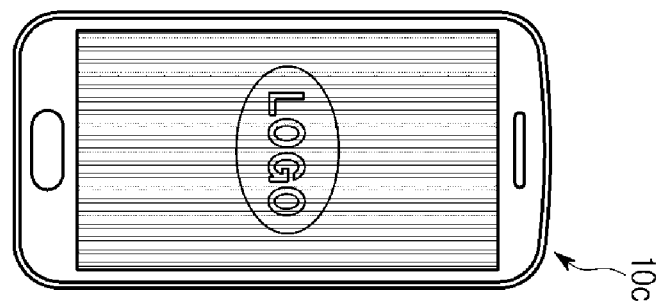
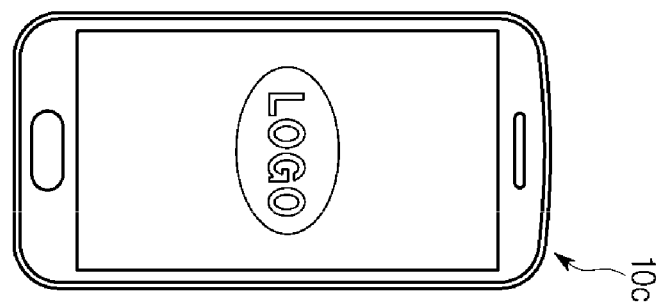
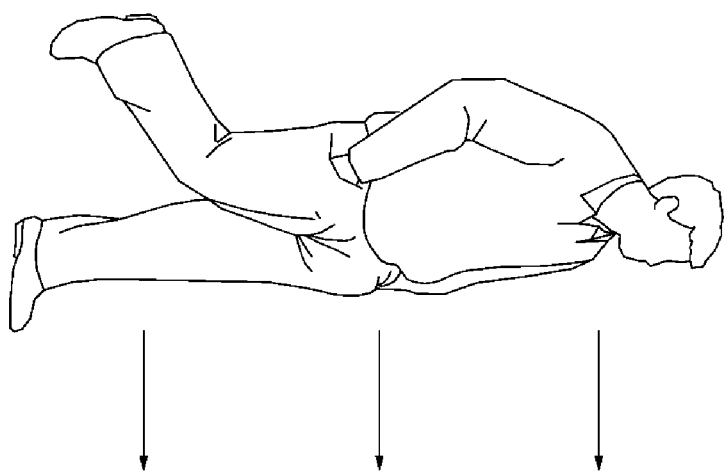
[Fig. 41]

[Fig. 42]
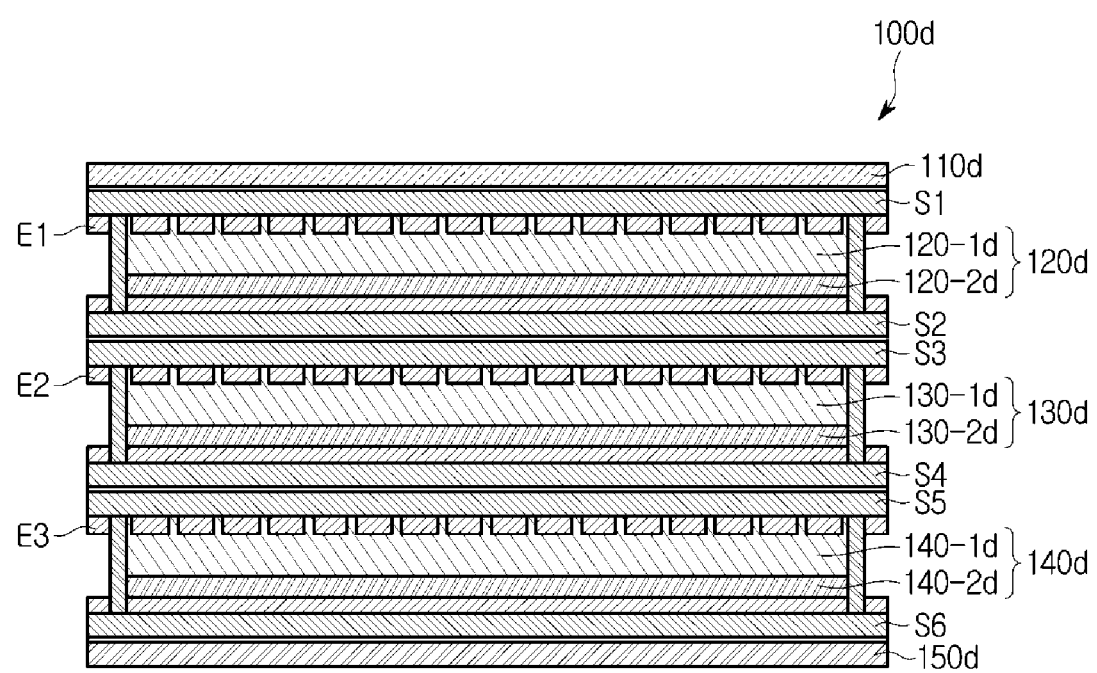

[Fig. 43]
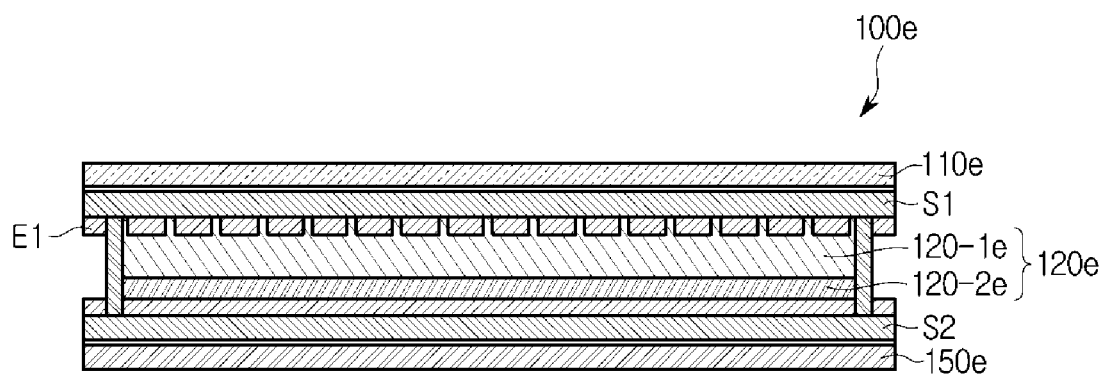

[Fig. 44]
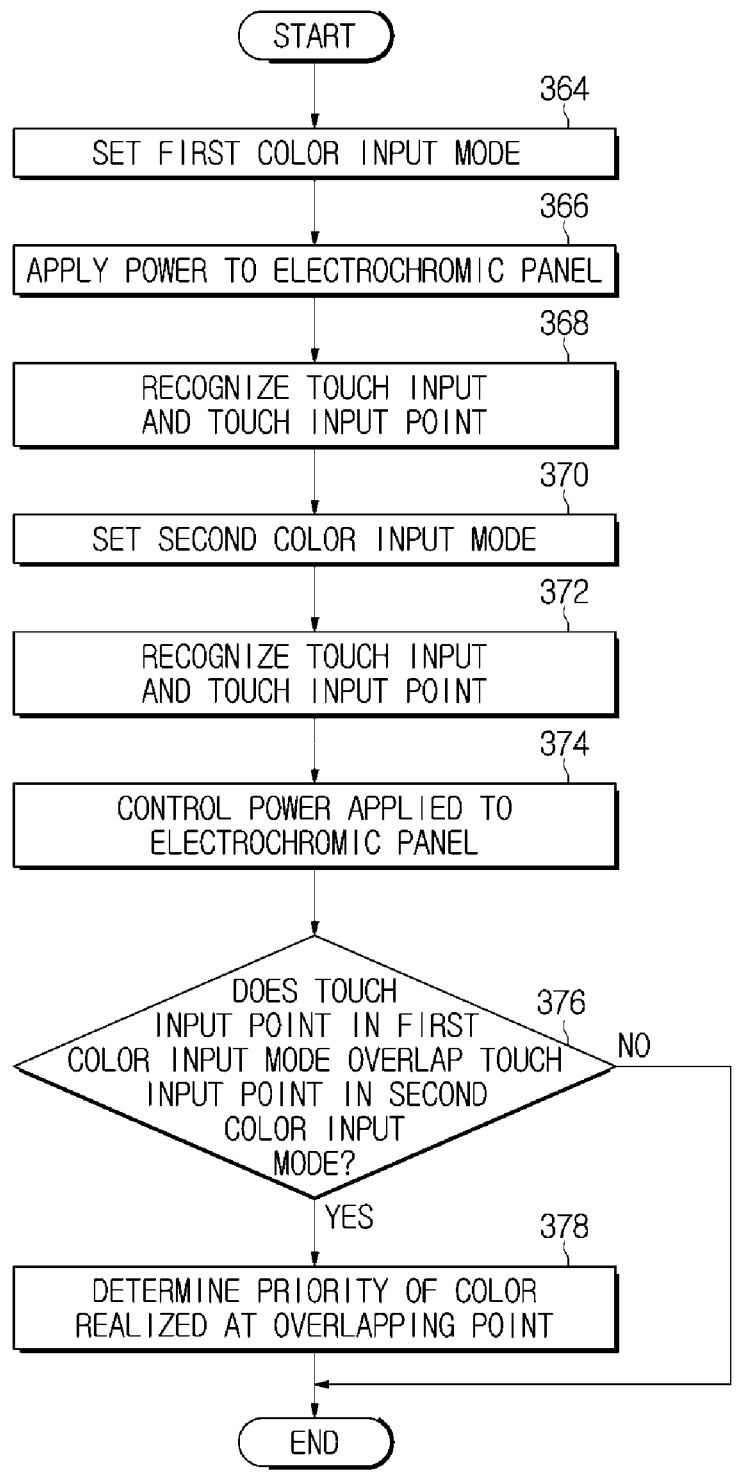

[Fig. 45]
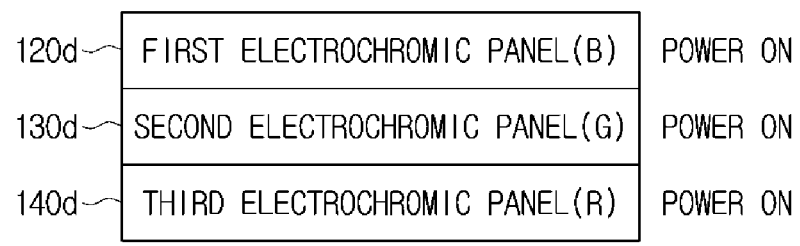

[Fig. 46]
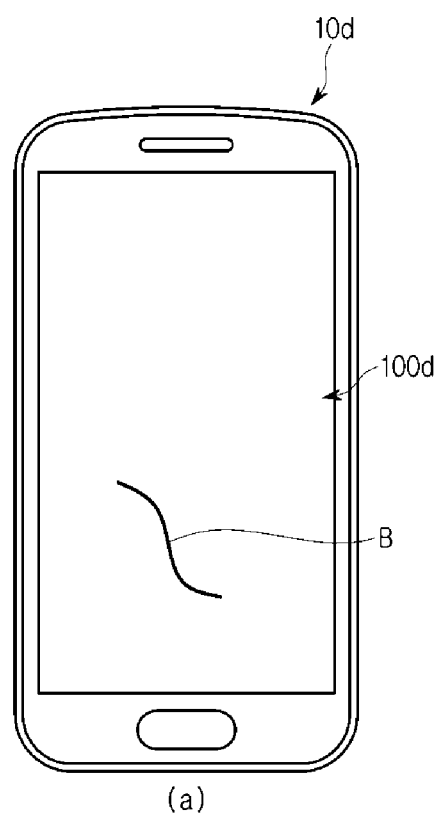

[Fig. 47]
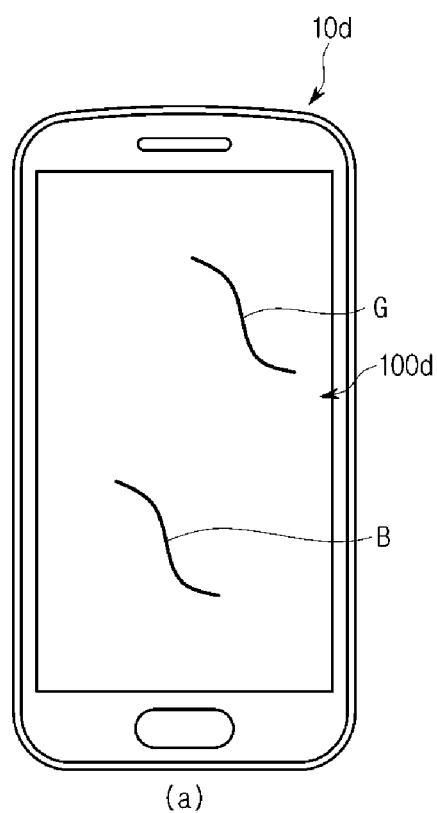

ELECTRONIC APPARATUS AND CONTROL METHOD THEREOF

CROSS-REFERENCE TO RELATED APPLICATIONS

This application is a National Phase Application under 35 U.S.C. § 371 of PCT International Patent Application No. PCT/KR2016/012797, filed Nov. 8, 2016 which claims the foreign priority benefit under 35 U.S.C. § 119 to Korean Patent Application No. 10-2015-0168882 filed Nov. 30, 2015, the contents of which are incorporated herein by reference.

TECHNICAL FIELD

The present disclosure is to provide an electronic apparatus configured to provide a color note function and a control method thereof.

BACKGROUND ART

A display element is a device for displaying visual and stereoscopic image information. Recently, flat display devices having good performance (e.g., high-definition) in several respects have been developed.

Representative examples of the flat display devices may include a thin-film transistor liquid crystal display (TFT-LCD), a liquid crystal display (LCD), etc. Such display devices may be classified as a transmissive display or a reflective display.

A thin-film transistor liquid crystal display, which is a kind of transmissive liquid crystal display, has a problem in that power consumption of a backlight light source located below a lower substrate is large.

Thus, as a reflective liquid crystal display, a cholesteric liquid crystal display element was researched and developed. In order to realize full color, the cholesteric liquid crystal display may be implemented by stacking three cholesteric liquid crystal display elements with different pitches or by partitioning cholesteric liquid crystals with different pitches in a single layer by using partition walls.

DETAILED DESCRIPTION OF THE INVENTION

Technical Problem

One aspect of the present invention is to provide an electronic apparatus which is configured to provide a color note function by means of a physical force of an external input means, and a control method thereof.

Another aspect of the present invention is to provide an electronic apparatus which is configured to provide a variable polarization function by interposing a blackening material between cholesteric liquid crystal molecules, and a control method thereof.

Technical Solution

A display element according to an aspect of the present invention includes a touch panel, a privacy protection layer placed adjacent to the touch panel and configured to switch to a viewing angle adjustment mode when a privacy protection mode is set, a first display panel placed adjacent to the privacy protection layer and provided to reflect light of a first predetermined wavelength region among light incident on a touch input point when a touch input is received, a second display panel placed adjacent to the first display panel and provided to reflect light of a second predetermined wavelength region among light incident on a touch input point when a touch input is received, a communicator configured to receive color information to be applied to the display panels, and a controller configured to control power applied to the display panels on the basis of the color information received by the communicator.

Also, the first display panel may be provided to reflect light of a first predetermined wavelength region among light incident on a touch input point when a touch input is received while power is off, and the second display panel may be provided to reflect light of a second predetermined wavelength region among light incident on a touch input point when a touch input is received while power is off.

Also, the first display panel may include a cholesteric liquid crystal placed with a first predetermined helical pitch when power is off, and the second display panel may include a cholesteric liquid crystal placed with a second predetermined helical pitch when power is off.

Also, the first and second display panels may be placed such that the cholesteric liquid crystals transmit light incident on the first and second display panels while power is on.

Also, when a first color input mode is set, the controller may perform a control operation to switch off power applied to the first display panel and switch on power applied to the second display panel.

Also, the electronic apparatus may further include a memory configured to store information regarding the touch input point received from an external input means.

Also, when a second color input mode is set, the controller may perform a control operation to switch on power applied to portions of the first display panel other than the touch input point and switch off power applied to the second display panel on the basis of the information stored in the memory.

Also, the controller may determine priority of a color realized at an overlapping point according to predetermined conditions when a touch input point in the first color input mode overlaps a touch input point in the second color input mode.

Also, the controller may determine whether a mix of a first color and a second color is realized at the overlapping point or the second color is realized at the overlapping point.

Also, the display panel may include an electrochromic layer including an organic electrochromic material and an electrolyte layer placed adjacent to the electrochromic layer.

Also, when a touch input is received by the touch panel, the controller may perform a control operation to supply power to a point of the electrochromic layer corresponding to the touch input point.

Also, the organic electrochromic material may realize a color during deoxidization and switch to a transmission mode during oxidization.

Also, the electronic apparatus may further include a memory configured to store information regarding the touch input point received by the touch panel.

Also, when the first color input mode is set, the controller may perform a control operation to switch on power applied to a point of the first display panel corresponding to a point where the touch input is received on the basis of the information stored in the memory and to maintain power applied to the second display panel in an "off" state.

Also, when the second color input mode is set, the controller may perform a control operation to switch on power applied to a point of the second display panel corresponding to the point where the touch input is received on the basis of the information stored in the memory and to maintain power applied to the first display panel in an "off" state.

Also, the controller may determine priority of a color realized at an overlapping point according to predetermined conditions when a touch input point in the first color input mode overlaps a touch input point in the second color input mode.

Also, the controller may determine whether a mix of a first color and a second color is realized at the overlapping point or the second color is realized at the overlapping point.

Subsequently, an electronic apparatus according to another aspect includes a touch panel, a privacy protection layer placed adjacent to the touch panel and configured to switch to a viewing angle adjustment mode due to a change in arrangement of a cholesteric liquid crystal and a blackening material when a privacy protection mode is set, and a controller configured to control power applied to the privacy protection layer when predetermined conditions are satisfied.

Also, the viewing angle adjustment mode may include alternately forming a light transmission pattern and a light reflection pattern on the privacy protection layer.

Also, the electronic apparatus may further include an X-axis driving unit configured to supply power in an X-axis direction of the privacy protection layer and a Y-axis driving unit configured to supply power in a Y-axis direction of the privacy protection layer.

Also, the electronic apparatus may further include a gyro sensor configured to collect rotation information of the electronic apparatus.

Also, when rotation of the electronic apparatus is detected on the basis of the information collected by the gyro sensor, the controller may switch on or off power supplied to the X-axis driving unit and the Y-axis driving unit.

Also, the electronic apparatus may further include a radio frequency (RF) sensor configured to collect RF signals near the electronic apparatus.

Also, when an RF signal is detected, the controller may control power applied to the privacy protection layer so that the privacy protection layer operates in the viewing angle adjustment mode.

Also, the privacy protection layer may be configured to switch to the transmission mode due to a change in arrangement of a cholesteric liquid crystal and a blackening material when the privacy protection mode is released.

Subsequently, an electronic apparatus according to still another aspect includes a touch panel, a first display panel placed adjacent to the touch panel and provided to reflect light of a first predetermined wavelength region among light incident on a touch input point when a touch input is received while power is off, a second display panel placed adjacent to the first display panel and provided to reflect light of a second predetermined wavelength region among light incident on a touch input point when a touch input is received while power is off, and a controller configured to control power applied to the first and second display panels according to a predetermined mode.

Also, the first display panel may include a cholesteric liquid crystal placed with a first predetermined helical pitch when power is off, and the second display panel may include a cholesteric liquid crystal placed with a second predetermined helical pitch when power is off.

Also, the first and second display panels may be placed such that the cholesteric liquid crystals transmit light incident on the first and second display panels while power is on.

Also, when a first color input mode is set, the controller may perform a control operation to switch off power applied to the first display panel and switch on power applied to the second display panel.

Also, the electronic apparatus may further include a memory configured to store information regarding the touch input point.

Also, when a second color input mode is set, the controller may perform a control operation to switch on power applied to portions of the first display panel other than the touch input point and switch off power applied to the second display panel on the basis of the information stored in the memory.

Also, the controller may determine priority of a color realized at an overlapping point according to predetermined conditions when a touch input point in the first color input mode overlaps a touch input point in the second color input mode.

Also, the controller may determine whether a mix of a first color and a second color is realized at the overlapping point or the second color is realized at the overlapping point.

Also, the electronic apparatus may further include a third display panel placed adjacent to the second panel and provided to reflect light of a third predetermined wavelength region among light incident on a touch input point when a touch input is received while power is off.

Also, the third display panel may include a cholesteric liquid crystal placed with a third predetermined helical pitch when power is off.

Subsequently, an electronic apparatus according to still another aspect includes a touch panel, at least one display panel placed adjacent to the touch panel and provided to reflect light of a predetermined wavelength region among light incident on a touch input point when a touch input is received from an external input means while power is off, a communicator provided to transmit and receive color information to be applied to the display panel to and from the external input means, and a controller configured to control power applied to the display panel on the basis of the color information received by the communicator.

Also, the external input means may include an input unit configured to receive a color selection command to be applied to the electronic apparatus, a display configured to display a selected color, a memory configured to store information regarding the selected color, and a communicator configured to transmit the selected color to the communicator of the electronic apparatus.

Also, when color selection commands are sequentially input through the input unit, the display may sequentially display colors selected according to the color selection commands.

Also, when color selection commands are input from the input unit during a first predetermined time, the display may sequentially display selectable colors.

Also, when an input mode for the display panel is set by the electronic apparatus, the communicator may transfer information regarding the set input mode to the external input means.

Next, a method of controlling an electronic apparatus according to an aspect includes setting a color input mode of the electronic apparatus, switching off power applied to any one of the first and/or a second display panels according to the color input mode and switching on power applied to the other display panel, and receiving a touch input.

Also, the switching off of power applied to any one of the first and/or second display panels according to the color input mode and the switching on of power applied to the other display panel may include switching off power applied to the first display panel and switching on power applied to the second display panel when a first color input mode is set.

Also, the method may further include storing information regarding the touch input point in a memory.

Also, the method may further include switching on power applied to portions of the first display panel other than the touch input point and switching off power applied to the second display panel on the basis of the information stored in the memory when a second color input mode is set.

Also, the method may further include determining priority of a color realized at an overlapping point according to predetermined conditions when a touch input point in the first color input mode overlaps a touch input point in the second color input mode.

Also, the determining of priority of a color realized at an overlapping point may include determining whether a mix of a first color and a second color is realized at the overlapping point or the second color is realized at the overlapping point.

Also, the setting of a color input mode of the electronic apparatus may include receiving information regarding the color input mode set by the external input means from the external input means.

Also, the setting of a color input mode of the electronic apparatus may include setting the color input mode by means of the electronic apparatus and transmitting information regarding the set mode to the external input means.

Also, the electronic apparatus may further include a privacy protection layer configured to switch to a viewing angle adjustment mode according to power applied thereto, and the method may further include switching the privacy protection layer to the viewing angle adjustment mode when a privacy protection mode is set.

Also, the method may further include collecting rotation information of the electronic apparatus from a gyro sensor provided in the electronic apparatus and rotating a viewing angle adjustment mode direction of the privacy protection layer on the basis of the rotation information of the electronic apparatus when rotation of the electronic apparatus is detected.

Also, the method may further include collecting an RF signal near the electronic apparatus from an RF sensor provided in the electronic apparatus and switching the privacy protection layer to the viewing angle adjustment mode when an RF signal is detected near the electronic apparatus.

Advantageous Effects of the Invention

According to a display element configured as described above and a control method thereof, by providing a note function by means of a physical force of an input means, it is possible to reduce delay of data input to the display element by means of the input means while simultaneously improving a feeling of writing for a user.

By providing a variable polarization function by interposing a blackening material between cholesteric liquid crystals, it is also possible to provide a selective privacy protection function according to a user's environment.

DESCRIPTION OF THE DRAWINGS

FIG. 1 is a perspective view of a mobile device to which a display element is applied according to an embodiment.

FIG. 2 is a perspective view of an external input means according to an embodiment.

FIG. 3 is a perspective view of a flip cover to which a display element is applied according to an embodiment.

FIG. 4 shows a structure of a display element in detail according to an embodiment.

FIG. 5 shows an electrode structure applied to a display element according to an embodiment.

FIG. 6 schematically shows a twisted structure of a cholesteric liquid crystal applied to a display panel of a display element according to an embodiment.

FIG. 7 is a schematic diagram showing a characteristic of reflecting light depending on pitches.

FIG. 8 shows an arrangement of liquid crystals in a homeotropic state.

FIG. 9 shows an arrangement of liquid crystals in a focal conic state.

FIG. 10 shows an arrangement of liquid crystals in a planar state.

FIG. 11 is a control block diagram of an external input means and a mobile device to which a display element is applied according to an embodiment.

FIG. 12 shows an example of a color input mode setting method of an external input means.

FIG. 13 shows another example of a color input mode setting method of an external input means.

FIG. 14 is a control block diagram of a flip cover, an external input means, and a mobile device according to an embodiment.

FIG. 15 is a flowchart of a case in which a color input mode of a mobile device is set through an external input means.

FIG. 16 is a flowchart of a case in which a color input mode of a mobile device is set through the mobile device.

FIG. 17 shows an example in which a color input mode is set through a mobile device.

FIG. 18 is a diagram in which methods of applying power to a liquid crystal panel A of a display element are summarized.

FIG. 19 is a control flowchart showing a control process of a mobile device according to an embodiment.

FIGS. 20 to 25 additionally illustrate the flowchart of FIG. 19.

FIG. 26 shows a structure of a display element according to another embodiment.

FIG. 27 shows a mobile device to which a display element is applied according to still another embodiment.

FIG. 28 shows a structure of a display element in detail according to still another embodiment.

FIG. 29 schematically shows a twisted structure of a blackening material and a cholesteric liquid crystal molecule applied to a privacy protection layer of a display element according to still another embodiment.

FIG. 30 shows a method in which a texture of a privacy protection layer switches according to an electric field applied to the privacy protection layer.

FIG. 31 is a control block diagram of a mobile device to which a display element is applied according to still another embodiment.

FIGS. 32 to 36 are diagrams showing examples of a method in which a privacy protection layer of a display element operates by adjusting an electric field applied to the privacy protection layer and an operation result screen.

FIG. 37 is a flowchart showing an example of a control method of an electronic apparatus according to still another embodiment.

FIG. 38 shows another example of a control method of an electronic apparatus according to still another embodiment.

FIG. 39 shows still another example of a control method of an electronic apparatus according to still another embodiment.

FIGS. 40 and 41 illustrate the control method of FIG. 39.

FIG. 42 shows an example of a display element having a display panel provided in the form of an electrochromic panel.

FIG. 43 shows a modification of a display element having a display panel provided in the form of an electrochromic panel.

FIG. 44 is a flowchart showing a control process of an electronic apparatus of FIG. 42.

FIGS. 45 to 47 additionally illustrate the flowchart of FIG. 44.

MODE OF THE INVENTION

The configurations shown in the embodiments and drawings described herein are merely examples of the present invention, and there may be various modifications at the time of filing of the present application to replace the embodiments and drawings.

An electronic apparatus according to the present invention may provide a color note function by means of a physical force of an external input means. Also, the electronic apparatus may provide a variable polarization function by providing a privacy protection layer obtained by interposing a blackening material into a cholesteric liquid crystal.

To this end, the electronic apparatus according to the present invention may include a display element. Such a display element may be included in a mobile device such as a cell phone, a tablet, and the like to display an image or provide a writing function in operation with a unique function of the mobile device. Depending on embodiments, the display element may be provided in a home appliance such as a refrigerator, an air conditioner, and the like to display an image or provide a writing function in operation with a unique function of the home appliance.

Embodiments of the present invention will be described in detail on the assumption that a mobile device is used as an example of an electronic apparatus and also a display element is applied to a mobile device and a flip cover of the mobile device.

FIG. 1 is a perspective view of a mobile device 10 to which a display element 100 is applied according to an embodiment, FIG. 2 is a perspective view of an external input means 200 according to an embodiment, and FIG. 3 is a perspective view of a flip cover 20 to which the display element 100 is applied according to an embodiment.

Referring to FIG. 1, the mobile device 10 according to an embodiment includes a main body 11, an input unit 12, and the display element 100.

The main body 11 includes a bezel forming an external appearance of the mobile device 10 and covering a border of the display element 100.

The input unit 12 and the display element 100 are placed on a front surface of the main body 11, and a driving module for controlling operation of the mobile device 10 is placed inside the main body 11.

The input unit 12 receives a command of a user and transmits an input signal to the driving module. The input unit 12 may be implemented in at least one of a button manner and a touch manner. When the input unit 12 is implemented in the touch manner, the display element 100 may further include a touch panel. In this case, the touch panel may be provided on a front surface of the display element 100.

The display element 100 may display a call image related to a phone call, a menu image related to an icon such as an app, a content execution image, and the like in response to a driving command of the driving module. Furthermore, when a touch input is received from the external input means 200, the display element 100 may display a touch trace.

While the mobile device 10 is not used, the external input means 200 may be housed in a storage space provided in the mobile device 10 as shown in FIG. 1A. In this case, a battery of the external input means 200 may be supplied and charged with power received from a battery of the mobile device 10. Meanwhile, the external input means 200 may be detached from the storage space and provided as a touch input means of the mobile device 10.

The external input means 200 may be provided in the form of a touch pen.

Referring to FIG. 2, the external input means 200 may include a body 201, an input unit 210 (210-1 and 210-2) (see FIG. 4) configured to receive a color setting command for a note to be written on the display element 100 of the mobile device 10, and a display 250 configured to display a selected color.

The input unit 12 may receive a setting command for a color input mode, that is, the color setting command for the note to be written on the display element 100 of the mobile device 10 from a user.

The input unit 210 (210-1 and 210-2) may be provided at the center of the body 201 or provided at one end of the body 201. Hereinafter, the input unit provided at one end of the body 201 is referred to as a second-prime input unit 210-1, and the input unit provided in the body 201 is referred to as a second-double-prime input unit 210-2.

The display 250 may be provided on an outer peripheral surface of the body of the external input means 200.

When a color selection command to be applied to the display element 100 of the mobile device 10 is input from the user, the display 250 may display a corresponding color.

Like the display element 100 according to an embodiment, the display 250 may be implemented in the form of a liquid crystal panel. However, examples of the display 250 are not limited to thereto, and the display 250 may be provided as an Electro Luminescence (EL) panel, an Electrophoretic Display (EPD) panel, an Electrochromic Display (ECD) panel, a Light Emitting Diode (LED) panel, an Organic Light Emitting Diode (OLED) panel, or the like.

Referring to FIG. 3, the flip cover 20 according to an embodiment may include a first cover 21, a second cover 22, and a display element 100.

The first cover 21 may be provided to house the main body 11 of the mobile device 10, and the second cover 22 may be provided to reveal or hide a front surface of the mobile device 10.

A display element 100a according to an embodiment may be applied to one surface of the second cover 22. The display element 100a applied to the second cover 22 may provide a screen that is the same as a display screen of the mobile device 10 depending on user settings.

As an example, when the second cover 22 is closed while a note is being written on the mobile device 10, the note being written on the mobile device 10 may be displayed on the display element 100a of the second cover 22.

As another example, when a text message is received by the mobile device 10 while the second cover 22 is closed, an icon or a pop-up window for making a notification that the text message has been received may be displayed on the display element 100a of the second cover 22.

A structure of the display element 100 according to an embodiment will be described below in detail. Since a structure of the display element 100a applied to the flip cover 20 is substantially the same as the structure of the display element 100 applied to the mobile device 10, the following description will focus on the display element 100 applied to the mobile device 10.

FIG. 4 shows the structure of the display element 100 in detail according to an embodiment, FIG. 5 shows an electrode structure applied to the display element 100 according to an embodiment, and FIG. 6 schematically shows a twisted structure of a cholesteric liquid crystal applied to a display panel of the display element 100 according to an embodiment.

Referring to FIG. 4, the display element 100 may include a touch panel 110, a first display panel 120, a second display panel 130, and a third display panel 140.

More specifically, the display element 100 may include a first substrate S1, a second substrate S2 spaced apart from the first substrate S1, a first electrode E1 placed on one surface of the first substrate S1, and a second electrode E2 placed on one surface of the second substrate S2. The first display panel 120 may be placed between the first electrode E1 and the second electrode E2.

Also, the display element 100 may include a third substrate S3, a fourth substrate S4 spaced apart from the third substrate S3, a third electrode E3 placed on one surface of the third substrate S3, and a fourth electrode E4 placed on one surface of the fourth substrate S4. The second display panel 130 may be placed between the third electrode E3 and the fourth electrode E4.

Also, the display element 100 may include a fifth substrate S5, a sixth substrate S6 spaced apart from the fifth substrate S5, a fifth electrode E5 placed on one surface of the fifth substrate S5, and a sixth electrode E6 placed on one surface of the sixth substrate S6. The third display panel 140 may be placed between the fifth electrode E5 and the sixth electrode E6.

Also, a light absorbing layer 150 may be provided on one surface of the sixth substrate S6 and may be made of a light absorbing material.

Meanwhile, Optical Clear Adhesive (OCA) glue films may be provided between the touch panel 110 and the first substrate S1, between the second substrate S2 and the third substrate S3, between the fourth substrate S4 and the fifth substrate S5, and between the sixth substrate S6 and the light absorbing layer 150, and the layers may be combined using the glue films.

The first to sixth substrates S1 to S6 may be formed of a flexible glass or a transparent plastic material.

When a plastic material is used, the display element 100 may be implemented to be thin and light. In this case, the display element 100 may be freely bent or turned, and thus may be applied to new apparatuses in various fields on the basis of freedom of design. Polycarbonate may be used as the plastic material.

Each of the first to sixth electrodes E1 to E6 may use a transparent electrode in order to increase transmittance of the display element 100. More specifically, the first to sixth electrodes E1 to E6 may be formed of an Indium Tin Oxide (ITO), an Indium Zinc Oxide (AZO), or the like.

Referring to FIG. 5, the first and second electrodes E1 and E2 may be placed in the form of straight lines parallel to the first substrate S1 and the second substrate S2, respectively. In this case, the first and second electrodes E1 and E2 may be placed to vertically intersect each other, and a pixel may be formed at a point where the first and second electrodes E1 and E2 intersect.

The display element 100 may be driven either passively or actively. When the display element 100 is actively driven, a transistor may be mounted on each pixel in the display element 100. That is, a thin-film transistor (TFT) panel having a transistor for driving a pixel may be formed on the first substrate S1 of the display element 100.

Transistors for switching respective pixels may be formed on the TFT panel. In this case, the second electrode E2 formed on the second substrate S2 may function as a common electrode for generating an electric field in the first display panel 120 along with an output voltage of the transistor.

FIG. 5 shows the first and second electrodes E1 and E2 as an example, but the same description about the first and second electrodes E1 and E2 may be applied to the third and fourth electrodes E3 and E4 and the fifth and sixth electrodes E5 and E6.

Each of the first to third display panels 120, 130, and 140 may be a liquid crystal panel accommodating a cholesteric liquid crystal. In order to distinguish from other embodiments to be described below, the first, second, and third display panels 140 will hereinafter be referred to as first, second, and third liquid crystal panels 120, 130, and 140.

The first liquid crystal panel 120 may include a cholesteric liquid crystal placed to form a first predetermined helical pitch when power is off, the second liquid crystal panel 130 may include a cholesteric liquid crystal placed to form a second predetermined helical pitch when power is off, and the third liquid crystal panel 140 may include a cholesteric liquid crystal placed to form a third predetermined helical pitch when power is off.

Each liquid crystal panel may include a cholesteric liquid crystal and a photopolymerizable polymer cured to fix a helical pitch (p) of the cholesteric liquid crystal.

The cholesteric liquid crystal may be formed by mixing a chiral dopant inducing a periodic helical structure with a nematic liquid crystal compound.

The nematic liquid crystal compound is a non-photo sensitive liquid crystal compound that is not polymerized or decomposed by light. Accordingly, as will be described below, even when light is incident, the nematic liquid crystal compound may maintain a monomer form without being polymerized or decompressed and may be oriented in a certain direction by an applied voltage or the like.

A photo sensitive chiral dopant reactive with ultraviolet rays may be used as the chiral dopant. A photo sensitive chiral dopant is a compound that reacts with light and exhibits a chiral characteristic and may be a photopolymerizable chiral dopant capable of being polymerized by light, a photodegradable chiral dopant capable of being decomposed by light, a photoisomerizable chiral dopant capable of being isomerized by light, or a combination thereof.

When a photo sensitive chiral dopant absorbs light, helical twisting power (HTP) of a molecule may change. For example, when a photoisomerizable chiral dopant absorbs light, the photoisomerizable chiral dopant may be isomerized from trans to cis or from cis to trans with respect to its structure, thus decreasing or increasing helical twisting power.

Referring to FIG. 6, a cholesteric liquid crystal molecule C is repeatedly twisted at regular distances. In this case, the repeated distance is referred to as a pitch p, which may have a characteristic of selectively reflecting light depending on a twisting direction and a repeating structure of the helix.

A reflection wavelength band thereof is determined by the size of the pitch p. When the average refractive index of the cholesteric liquid crystal molecule C is n, the maximum reflection wavelength A may be expressed in Equation 1 below.

$$\lambda = n \cdot p \quad \text{[Equation 1]}$$

Also, when the normal refractive index of the liquid crystal is no and the abnormal refractive index of the liquid crystal is ne, the relationship between the reflection wavelength band and the pitch p may be expressed in Equation 2 below.

$$no \cdot p < \lambda < ne \cdot p \quad \text{[Equation 2]}$$

Here, the pitch p may be adjusted according to the content of the chiral dopant. As the content of the chiral dopant increases, the pitch p may decrease, and thus the reflection wavelength band may decrease. As the content of the chiral dopant decreases, the pitch p may increase, and thus the reflection wavelength band may increase.

A photopolymerizable polymer fixes a helical pitch p on a cholesteric liquid crystal. A photopolymerizable polymer is provided in the form of a monomer when a liquid crystal panel is manufactured. When light is provided to the monomer, a polymerization reaction is caused by a photopolymerization initiator and a crosslinking agent contained in the monomer to form a polymer network.

The polymer network is formed differently depending on the amount of light provided, and the size of the helix pitch p may be determined depending on the degree of formation of the polymer network. That is, as the amount of light provided increases, the degree of formation of the polymer network increases. When the polymer network is complexly formed, the size of the pitch p increases, and the reflection wavelength band increases.

The relationship between the reflection wavelength band and the size of the pitch p will be described below with reference to FIG. 7.

FIG. 7 is a schematic diagram showing a characteristic of reflecting light depending on the pitch p.

A liquid crystal layer reflects external light on the basis of Bragg's Law. As shown in FIG. 7, the wavelength band of light reflected differs depending on the pitch p of the crystal liquid.

When the pitch p of the liquid crystal is a first pitch P1, the liquid crystal layer may reflect light of a first wavelength region CL1. When the pitch p of the liquid crystal is a second pitch P2, the liquid crystal layer may reflect light of a second wavelength region CL2. When the pitch p of the liquid crystal is a third pitch P3, the liquid crystal layer may reflect light of a third wavelength region CL3. In this case, according to Equation 1, the first wavelength region CL1 may be a short-wavelength region, the third wavelength region CL3 may be a long-wavelength region, and the second wavelength region CL2 may be a wavelength region between the first wavelength region CL1 and the third wavelength region CL3. The following description assumes that the first wavelength region is a blue wavelength region, the second wavelength region is a green wavelength region, and the third wavelength region is a red wavelength region. However, examples of the wavelength regions are not limited thereto.

Textures of cholesteric liquid crystals may be differently formed depending on a physical force or an electric field applied to each liquid crystal panel.

More specifically, the textures of the cholesteric liquid crystals may be classified into a planar state, a focal conic state, and a homeotropic state, depending on a physical force or an electric field applied to each liquid crystal panel.

Such a liquid crystal panel may have bistability in which the panel may be present in the planar state and the focal conic state, in which light may be reflected even when there is no electric field. When the liquid crystal panel is present in the planar state or the focal conic state, the liquid crystal panel may switch to the homeotropic state capable of transmitting light by applying a sufficiently high electric field to the liquid crystal panel.

A planar state refers to a state in which a helical axis of a cholesteric liquid crystal is arranged substantially perpendicular to a substrate, for example, the first substrate. A focal conic state refers to a state in which a helical axis of a cholesteric liquid crystal is arranged in a disorderly manner with respect to the first substrate S1.

For example, when a voltage is applied to cholesteric liquid crystals in the planar state, a helical axis that was perpendicular to the first substrate S1 is changed to a disordered state with respect to the first substrate S1, and textures of the cholesteric liquid crystals may switch to the focal conic state.

When a higher voltage is applied to the cholesteric liquid crystals in the focal conic state, the cholesteric liquid crystals are changed to the homeotropic state, in which the helical structure is untwisted so that liquid crystal molecules are arranged in a direction of the electric field. In this case, the cholesteric liquid crystals may return to the focal conic state when the electric field is gradually removed and may return to the planar state when the electric field is rapidly removed.

Meanwhile, when a touch input is received by the display element 100 through the external input means 200, the cholesteric liquid crystals may switch from the focal conic state to the planar state, thus performing color representation.

Placements of the cholesteric liquid crystals will be described below with reference to FIGS. 8 to 10.

FIG. 8 shows an arrangement of liquid crystals in the homeotropic state.

The arrangement of liquid crystals in the homeotropic state is an arrangement that is made when a high electric field is applied to the liquid crystals, and has a characteristic of transmitting light.

FIG. 9 shows an arrangement of liquid crystals in the focal conic state.

The arrangement of the liquid crystals in the focal conic state is an arrangement that is made when a high electric field applied to the liquid crystals in the homeotropic state is gradually lowered. In the focal conic state, helical structure axes are disordered or not arranged. The arrangement has a characteristic of scattering incident light.

In the focal conic state, light may pass through the liquid crystals, and haze may occur because a helical structure is disordered.

FIG. 10 shows an arrangement of liquid crystals in the planar state.

The arrangement of liquid crystals in the planar state is an arrangement that is made when a high electric field applied to the liquid crystals in the homeotropic state is rapidly lowered. In the planar state, all helical structural axes are perpendicular to a surface of a substrate, for example, the first substrate S1.

In the planar state, the cholesteric liquid crystal reflects light of a specific wavelength range among incident light. In this case, the specific wavelength is determined depending on the size of the pitch p in the helical structure of the cholesteric liquid crystals. That is, the wavelength of reflected light may be determined by adjusting the pitch p, and thus a reflected color may be adjusted by adjusting the pitch p of the cholesteric liquid crystals.

A configuration of the mobile device 10 to which the display element 100 is applied according to an embodiment will be described in detail with reference to a control block diagram.

FIG. 11 is a control block diagram of the external input means 200 and the mobile device 10 to which the display element 100 is applied according to an embodiment.

The mobile device 10 may be provided to communicate with the external input means 200.

First, a configuration of the mobile device 10 will be described in detail.

Referring to FIG. 11, the mobile device 10 may include an input unit 12 and a display element 100, and the display element 100 may include a communicator 160, a memory 170, a driving unit 180, a controller 190, and liquid crystal panels 120, 130, and 140. FIG. 11 shows an example in which the communicator 160, the memory 170, and the controller 190 are provided in the display element 100. However, the above elements may be provided in the mobile device 10. In order to distinguish from other elements, the input unit 12 is referred to as a first input unit 12, the communicator is referred to as a first communicator 160, the memory is referred to as a first memory 170, the driving unit is referred to as a first driving unit 180, the liquid crystal panel is referred to as a liquid crystal panel A, and the controller is referred to as a first controller 190.

The first input unit 12 may receive a control command for the display element 100 of the mobile device 10 from a user. The first input unit 12 may employ a hard key scheme, a proximity sensor scheme, or a graphic user interface (GUI) scheme such as a touch pad in order to receive the user's input. When the first input unit 12 employs the GUI scheme such as a touch pad, the touch panel 110 of FIG. 4 may function as the first input unit 12.

The first communicator 160 may connect the mobile device 10, i.e., the display element 100 of the mobile device 10 to the external input means 200 by control of the first controller 190.

When an input mode for the liquid crystal panel A is set through an application of the mobile device 10, the first communicator 160 may transmit information regarding the input mode (hereinafter also referred to as input mode information) to the external input means 200. The input mode information may refer to information regarding a color input mode for setting a color of a touch input to be applied to the mobile device 10, and the color input mode may include a first color input mode in which a predetermined first color is input, a second color input mode in which a predetermined second color is input, a third color input mode in which a predetermined third color is input, and the like. Here, the first color may be a blue color, the second color may be a green color, and the third color may be a red color. However, examples of the colors are not limited thereto.

Depending on the embodiment, when touch input points overlap each other, the input mode information may include mixed-color input mode information that displays a color of the overlapping part as a mix of two colors, solid-color display mode information that displays a color of the overlapping part as a color which is input later in time, etc.

The first communicator 160 may receive input mode setting information that is set through the external input means 200, in more detail, color input mode setting information from the external input means 200. Here, the color input mode setting information may be referred to as color setting information for a touch input to be applied to the display element 100 of the mobile device 10.

The first communicator 160 may include at least one of a wired Ethernet unit, a wireless local area network (WLAN) unit, and a short-range communication unit, and the short-range communication unit may include a Bluetooth unit, a Bluetooth Low Energy (BLE) unit, an Infrared Data Association (IrDA) unit, a wireless fidelity (Wi-Fi) unit, an Ultra-WideBand (UWB) unit, a Near Field Communication (NFC) unit, or the like.

The first memory 170 may store information regarding a control program for controlling the display element 100 of the mobile device 10, a dedicated application initially provided by a manufacturer, or a general-purpose application downloaded from an outside source.

The first memory 170 may store information regarding an input signal corresponding to the driving of the display element 100 and state information of the display element 100 corresponding to the input signal. More specifically, the first memory 170 may store color input mode information for the display element 100 received from the first input unit 12 of the mobile device 10 and touch input point information input to the display element 100 from the external input means 200.

In this case, the touch input point information may be coordinate value information for a touch input point of the display element 100 or sensor value information collected from a separate position sensor.

As an example, when a touch input is received by the touch panel 110, capacitance of the touch panel may change. In this case, the first controller 190 may determine a point where the capacitance changes as the touch input point. As a result, the first memory 170 may store coordinate value information for the point where the capacitance changes.

The first memory 170 may be used as a term to include a read-only memory (ROM) and a random access memory (RAM) of the first controller 190. The first memory 170 may include a nonvolatile memory, a volatile memory, a hard disk drive (HDD), a solid state drive (SSD), or the like.

The first driving unit 180 may adjust power applied to the liquid crystal panel A. The first driving unit 180 may include a driver IC. More specifically, the first driving unit 180 may include an X-axis driving unit configured to supply power in an X-axis direction of the liquid crystal panel A and a Y-axis driving unit configured to supply power in a Y-axis direction of the liquid crystal panel A.

The liquid crystal panel A may include a first liquid crystal panel 120, a second liquid crystal panel 130, and a third liquid crystal panel 140. Each liquid panel may or may not be supplied with power by the driving of the first driving unit 180.

Cholesteric liquid crystals provided in each liquid crystal panel may be present in the focal conic state when power is off. As described above, light incident on the liquid crystal panel A in the focal conic state is transmitted or scattered.

In this case, when a touch input is received by the liquid crystal panel A through the external input means 200, the arrangement of the cholesteric liquid crystals switches to the planar state. As a result, light of a specific wavelength range among the light incident on the touch input point may be reflected, and thus it is possible to implement a note with a specific color.

On the contrary, when a high voltage is applied to the liquid crystal panel A so that the arrangement of cholesteric liquid crystals may switch to the homeotropic state, the written note may be deleted.

An implementation of the color note will be described in detail in the following specific embodiment.

The first controller 190 may function to control the overall operation of the display element 100 of the mobile device 10, control signal flow between internal elements of the display element 100 of the mobile device 10, and process data.

The first controller 190 may include a processor, a ROM configured to store a control program for controlling the display element 100 of the mobile device 10, and a RAM configured to store a signal or data input from the outside of the mobile device 10 or used as a storage area corresponding to various tasks performed by the mobile device 10.

The first controller 190 may adjust an electric field applied to the first, second, and third liquid crystal panels 120, 130, and 140 depending on an input mode set by a user.

For example, when a first color input mode is set, the first controller 190 may switch off power applied to the first liquid crystal panel 120 and may switch on power applied to the second and third liquid crystal panels 130 and 140.

Subsequently, when a second color input mode is set, power applied to portions of the first liquid crystal panel 120 other than the touch input point may be switched on, power applied to the third liquid crystal panel 140 may be switched on, and power applied to the second liquid crystal panel 130 may be switched off.

Subsequently, a configuration of the external input means 200 will be described in detail.

Referring to FIG. 11, the external input means 200 according to an embodiment may include an input unit 210, a communicator 220, a memory 230, a driving unit 240, a display 250, and a controller 260. In order to distinguish from other elements, the input unit is referred to as a second input unit 210, the communicator is referred to as a second communicator 220, the memory is referred to as a second memory 230, the driving unit is referred to as a second driving unit 240, and the controller is referred to as a second controller 260.

The second input unit 210 may receive a selection command for a color to be applied to the display element 100 of the mobile device 10 from a user. The second input unit 210 may include a second-prime input unit 210-1 provided at one end of the body and a second-double-prime input unit 210-2 provided in the body, as described above. The second input unit 210 may employ a hard key scheme, a proximity sensor scheme, or a touch scheme in order to receive the user's input. However, examples of the second input unit 210 are not limited thereto.

The user may manipulate the second input unit 210 to set a color input mode of the mobile device 10.

FIG. 12 shows an example of the color input mode setting method of the external input means 200, and FIG. 13 shows another example of the color input mode setting method of an external input means.

Referring to FIG. 12, the second-prime input unit 210-1 of the external input means 200 according to an embodiment may sequentially receive a color selection command from a user. As the color selection command is received from the user, the display 250 may sequentially display a selected color. For example, display 250 may display the selected color in the order of red (R), green (G), blue (B), cyan (C), magenta (M), and yellow (Y).

Referring to FIG. 13, the second-prime input unit 210-1 of the external input means 200 according to an embodiment may receive the color selection command from the user for a first predetermined amount of time. That is, when a pressure is applied to the second-prime input unit 210-1 by the user for the first predetermined amount of time, the display 250 may sequentially display selectable colors over time.

The second memory 230 may store information regarding a control program for controlling the external input means 200 and a dedicated application initially provided by a manufacturer.

The second memory 230 may store information regarding a color selected through the second input unit 210. When a color is reselected from a user, the second memory 230 may store information regarding the reselected color.

The second communicator 220 may connect the external input means 200 to the mobile device 10 by control of the second controller 260.

When the color input mode of the mobile device 10 is set through the second input unit 210, the second communicator 220 may transmit information regarding the setting to the mobile device 10.

When an input mode for the liquid crystal panel A is set through the mobile device 10, the second communicator 220 may receive information regarding the input mode.

The second controller 260 may perform a function of controlling the overall operation of the external input means 200, controlling signal flow between internal elements of the external input means 200, and processing data.

The second controller 260 may control the second communicator 220 so that information regarding a color set through the second input unit 210 is transmitted to the mobile device 10. The second controller 260 may also control the display 250 so that a corresponding color is displayed on the display 250.

In the above-described embodiment, an example in which the mobile device 10 and the external input means 200 are provided to communicate with each other has been described. However, depending on the embodiment, the flip cover 20 may be involved in the communication therebetween. That is, note information applied to the mobile device 10 may be displayed on the display element 100 of the flip cover 20 through communication between the mobile device 10 and the flip cover 20 or between the external input means 200 and the flip cover 20.

An embodiment in which the flip cover 20 is involved in communication between the mobile device 10 and the external input means 200 will be described below with reference to the accompanying drawings.

FIG. 14 is a control block diagram of the mobile device 10, the external input means 200, and the flip cover 20 according to an embodiment.

The flip cover 20 according to an embodiment may be provided to communicate with the mobile device 10 and the external input means 200, and the mobile device 10 may be provided to communicate with the external input means, as described above.

The mobile device 10 and the external input means 200 according to an embodiment may have substantially the same configurations as those described with reference to FIG. 10. Accordingly, redundant description thereof will be omitted here.

Referring to FIG. 14, the flip cover 20 may include an input unit 23 and a display element 100a, and the display element 100a may include a communicator 160a, a memory 170a, a driving unit 180a, liquid crystal panels 120a, 130a, and 140a, and a controller 190a. In order to distinguish from other elements, the input unit 23 is referred to as a third input unit 23, the communicator is referred to as a third communicator 160a, the memory is referred to as a third memory 170a, the driving unit is referred to as a third driving unit 180a, the liquid crystal panel is referred to as a liquid crystal panel B, and the controller is referred to as a third controller 190a. Details of the third driving unit 180a, the liquid crystal panel B, and the third controller 190a that can be understood from what has been described with reference to FIG. 11 will be omitted here.

The third input unit 23 may receive a control command for the display element 100a of the flip cover 20 from the user. Details of the third input unit 23 that can be understood from what has been described about the first input unit 12 will be omitted here.

The third communicator 160a may connect the flip cover 20 to the mobile device 10 or the external input means 200 by control of the third controller 190a.

The third communicator 160a may receive display information including note information applied to the display element 100 of the mobile device 10 from the mobile device 10. Here, the display information of the mobile device 10 may include screen information of an application provided by the mobile device 10. Depending on the embodiment, the third communicator 160a may receive text message reception information or the like from the mobile device 10.

The third communicator 160a may receive color setting information that is set through the external input means 200 from the external input means 200. Here, the color setting information may denote color setting information for a touch input to be applied to the display element 100a of the flip cover 20.

The third controller 190a performs a function of controlling the overall operation of the flip cover 20, controlling signal flow between internal elements of the flip cover 20, and processing data.

The third controller 190a may control an electric field applied to the liquid crystal panel B so that information received from the third communicator 160a is displayed on the display element 100a of the flip cover 20.

Depending on the embodiment, a user's touch input may be received on the display element 100a of the flip cover 20. In this case, the third controller 190a may control switching on or off of power applied to the liquid crystal panel B in the same manner as that of the first controller 190.

The configurations of the mobile device 10 to which the display elements 100 and 100a are applied according to an embodiment, the flip cover 20, and the external input means 200 have been described in detail.

A color input mode setting process and an operating principle of the display elements 100 and 100a according to an embodiment will be described in detail with reference to the accompanying drawings. For convenience of description, the display element 100 of the mobile device 10 will be described as an example, and the description of the display element 100 of the mobile device 10 may include a description of the display element 100a of the flip cover 20.

First, the color input mode setting process of the display element 100 of the mobile device 10 according to an embodiment will be described with reference to FIGS. 15 and 16.

FIG. 15 is a flowchart of a case in which a color input mode of the display element 100 of the mobile device 10 is set through the external input means 200.

Referring to FIG. 15, first, a color input mode of the display element 100 of the mobile device 10 is set through the second input unit 210 of the external input means 200.

A method of setting the color input mode of the display element 100 of the mobile device 10 is the same as those described with reference to FIGS. 12 and 13. Accordingly, redundant description thereof will be omitted here (312).

When the color input mode of the display element 100 of the mobile device 10 is set, a color of the external input means 200 may be changed on the basis of the set color input mode. That is, the display 250 of the external input means 200 may display a corresponding color on the basis of information regarding the color input mode. Depending on the embodiment, the display 250 may also display a color settable during the color input mode setting process (314).

Subsequently, a connection between the mobile device 10 and the external input means 200 may be checked (316).

When the mobile device 10 and the external input means 200 are connected to each other, the mobile device 10 may receive mode setting information from the external input means 200 (318).

Subsequently, the mobile device 10 may control power applied to the liquid crystal panel A on the basis of the received mode setting information (320).

When the mobile device 10 and the external input means 200 are not connected to each other, the procedure may end.

FIG. 16 is a flowchart of a case in which a color input mode of the mobile device 10 is set through the mobile device 10, and FIG. 17 shows an example in which a color input mode is set through the mobile device 10.

Referring to FIG. 16, first, a color input mode of the mobile device 10 may be set through the mobile device 10.

The setting of a color input mode of the mobile device 10 through the mobile device 10 may include selecting a specific color through a color picker provided in the mobile device 10. Referring to FIG. 17, a user may select a red color R through a color picker CP provided on a display screen of the mobile device 10 by means of the external input means 200 (322).

When the color input mode of the mobile device 10 is set, the first controller 190 may control power applied to the liquid crystal panel A on the basis of color input mode setting information (324).

Subsequently, a connection between the mobile device 10 and the external input means 200 may be checked (326).

When the mobile device 10 and the external input means 200 are connected to each other, the mode setting information may be transferred to the external input means 200. When the mode setting information is transferred from the mobile device 10 to the external input means 200, a color of the external input means 200 may be changed on the basis of the transferred mode setting information. That is, the display 250 of the external input means 200 may display the red color R, as shown in FIG. 17, on the basis of the color input mode setting information.

When the mobile device 10 and the external input means 200 are not connected to each other, the procedure may end.

Subsequently, the operating principle of the display element 100 applied to the mobile device 10 according to an embodiment will be described in detail with reference to FIGS. 18 to 25.

The first liquid crystal panel 120 of the display element 100 according to an embodiment may include cholesteric liquid crystals placed to form a first predetermined helical pitch when power is off. The cholesteric liquid crystals may have bistability to be present in the focal conic state or the planar state when power is off.

When the cholesteric liquid crystals are placed in the focal conic state, and a physical force is applied to the cholesteric liquid crystals, an arrangement of the liquid crystals may be changed to the planar state. In this case, light of a first predetermined wavelength region among light incident onto the first liquid crystal panel 120 may be reflected. That is, it is possible to apply a touch input of a color corresponding to the first helical pitch when a physical force is applied to the cholesteric crystal liquids through the touch input while the cholesteric crystal liquids of the first liquid crystal panel 120 are placed in the focal conic state.

In this case, the cholesteric liquid crystals may be placed in the homeotropic state. Thus, even when a physical force is transferred to the second and third liquid crystal panels 130 and 140 while the first liquid crystal panel 120 is receiving the touch input, the arrangement of liquid crystals of the second and third liquid crystal panels 130 and 140 may be maintained in the homeotropic state. As a result, it is possible to apply a touch input of a color corresponding to the light of the first wavelength region.

FIG. 18 is a diagram in which methods of applying power to the liquid crystal panel A of the display element 100 are summarized.

For convenience of description, embodiments of the present invention will be described on the assumption that a touch input point of the first liquid crystal panel 120 reflects light of a first wavelength region capable of representing a blue color B when a touch input is received by the first liquid crystal panel 120 while power is off, a touch input point of the second liquid crystal panel 130 reflects light of a second wavelength region capable of representing a green color G when a touch input is received by the second liquid crystal panel 130 while power is off, and a touch input point of the third liquid crystal panel 140 reflects light of a third wavelength region capable of representing a red color R when a touch input is received by the third liquid crystal panel 140 while power is off.

Referring to FIG. 18, when the liquid crystal panel A receives a touch input while power is applied to the first and second liquid crystal panels 120 and 130 and cut off from the third liquid crystal panel 140, an arrangement of cholesteric liquid crystals of the third liquid crystal panel 140 may be changed from the focal conic state to the planar state. Thus, light of the third wavelength region among light incident on the third liquid crystal panel 140 may be reflected, and thus it is possible to implement a note with a red color R at the touch input point.

Also, when the liquid crystal panel A receives a touch input while power is applied to the first and third liquid crystal panels 120 and 140 and cut off from the second liquid crystal panel 130, an arrangement of cholesteric liquid crystals of the second liquid crystal panel 130 may be changed from the focal conic state to the planar state. Thus, light of the second wavelength region among light incident on the second liquid crystal panel 130 may be reflected, and thus it is possible to implement a note with a green color G at the touch input point.

Also, when the liquid crystal panel A receives a touch input while power is applied to the second and third liquid crystal panels 130 and 140 and cut off from the first liquid crystal panel 120, an arrangement of cholesteric liquid crystals of the first liquid crystal panel 120 may be changed from the focal conic state to the planar state. Thus, light of the first wavelength region among light incident on the first liquid crystal panel 120 may be reflected, and thus it is possible to implement a note with a blue color B at the touch input point.

Also, when the liquid crystal panel A receives a touch input while power is applied to the third liquid crystal panel 140 and cut off from the first and second liquid crystal panels 120 and 130, an arrangement of cholesteric liquid crystals of the first and second liquid crystal panels 120 and 130 may be changed from the focal conic state to the planar state. Thus, light of the first wavelength region among light incident on the first liquid crystal panel 120 may be reflected, and light of the second wavelength region among light incident on the second liquid crystal panel 130 may be reflected. As a result, it is possible to implement a note with a cyan color C at the touch input point.

Also, when the liquid crystal panel A receives a touch input while power is applied to the second liquid crystal panel 130 and cut off from the first and third liquid crystal panels 120 and 140, an arrangement of cholesteric liquid crystals of the first and third liquid crystal panels 120 and 140 may be changed from the focal conic state to the planar state. Thus, light of the first wavelength region among light incident on the first liquid crystal panel 120 may be reflected, and light of the third wavelength region among light incident on the third liquid crystal panel 140 may be reflected. As a result, it is possible to implement a note of a magenta color M at the touch input point.

Also, when the liquid crystal panel A receives a touch input while power is applied to the first liquid crystal panel 120 and cut off from the second and third liquid crystal panels 130 and 140, an arrangement of cholesteric liquid crystals of the second and third liquid crystal panels 130 and 140 may be changed from the focal conic state to the planar state. Thus, light of the second wavelength region among light incident on the second liquid crystal panel 130 may be reflected, and light of the third wavelength region among light incident on the third liquid crystal panel 140 may be reflected. As a result, it is possible to implement a note with a yellow color Y at the touch input point.

Also, when power is applied to all of the first, second, and third liquid crystal panels 120, 130, and 140, light incident on each liquid crystal panel is transmitted. As a result, the light absorbing layer 150 absorbs all of the incident light, and thus a black color B is realized.

Also, when the liquid crystal panel A receives a touch input while power is cut off to all of the first, second, and third liquid crystal panels 120, 130, and 140, arrangements of cholesteric liquid crystals of the first, second, and third liquid crystal panels 120, 130, and 140 may be changed from the focal conic state to the planar state.

Thus, light of the first wavelength region among light incident on the first liquid crystal panel 120 may be reflected, light of the second wavelength region among light incident on the second liquid crystal panel 130 may be reflected, and light of the third wavelength region among light incident on the third liquid crystal panel 140 may be reflected. As a result, it is possible to implement a note of a white color at the touch input point.

FIG. 19 is a control flowchart showing a control process of the mobile device 10 according to an embodiment, and FIGS. 20 to 25 additionally illustrate the flowchart of FIG. 19.

Referring to FIG. 19, the control process of the mobile device 10 according to an embodiment may include setting a color input mode of the display element 100 (330 and 336), controlling power applied to the liquid crystal panel A according to the color input mode (332 and 338), and receiving a touch input from the external input means 200 (334 and 340).

More specifically, the setting of a color input mode may include setting a first color input mode. The first color input mode is defined herein as a mode implemented by reflecting light of a first wavelength region at a touch input point when a touch input is received by a first display panel. Second and third color input modes may also be defined herein in a similar way.

The first color input mode may be set through the external input means 200 and then transferred to the mobile device 10 or may be set through an application of the mobile device 10 (330).

When the first color input mode is set, power applied to the liquid crystal panel A may be controlled.

This operation is to prepare for reception of the touch input so that a note with a corresponding color is implemented. Referring to FIG. 20, when the first color input mode is set, power applied to the first liquid crystal panel 120 may be switched off, and power applied to the second and third liquid crystal panels 130 and 140 may be switched on (332).

Subsequently, a touch input may be received from the external input means 200, and also a point where the touch input point is received may be recognized.

The first controller 190 may recognize the touch input point by collecting capacitance change information of the touch input point and detecting coordinates of the touch input point or may recognize the touch input point on the basis of sensor value information collected by a separate position sensor.

Information regarding the recognition of the touch input point (hereinafter also referred to as touch input point recognition information) in this operation may be stored in the first memory 170. The memory may provide touch input point recognition information for the first color input mode to a corresponding process if necessary (334).

FIG. 21 shows an example of a touch input in the first color input mode.

When the display element 100 of the mobile device 10 receives a touch input from the external input means 200, an arrangement of crystal liquids at the touch input point in the first liquid crystal panel 120 may be switched from the focal conic state to the planar state. As a result, as shown in FIG. 21A, it is possible to implement the note with a blue color B.

Depending on the embodiment, when a user desires to change a color of the touch input, a second color input mode may be set.

The second color input mode may be set through the external input means 200 and then transferred to the mobile device 10 or may be set through an application of the mobile device 10 (336).

When the second color input mode is set, power applied to the liquid crystal panel A may be controlled.

Referring to FIG. 22, when the second color input mode is set, power applied to points of the first liquid crystal panel 120 other than the touch input point may be switched on, power applied to the second liquid crystal panel 130 may be switched off, and power applied to the third liquid crystal panel 140 may be maintained in an "on" state. In this operation, the touch input point information stored in the memory may be provided when the switching of the power applied to the first liquid crystal panel 120 is controlled. Accordingly, redundant description thereof will be omitted here (338).

Subsequently, a touch input may be received from the external input means 200, and also a point where the touch input is received may be recognized. Details of a method of recognizing the touch input point that can be understood from what has been described in operation 334 will be omitted here (340).

When the touch input is received in the second color input mode, whether the touch input point in the first color input mode overlaps the touch input point in the second color input mode may be determined (342).

FIG. 23 shows an example in which a touch input point in the first color input mode and a touch input point in the second color input mode do not overlap each other, and FIG. 24 shows an example in which a touch input point in the first color input mode and a touch input point in the second color input mode overlap each other.

As shown in FIG. 23, when it is determined that the touch input points do not overlap each other, the procedure may end.

As shown in FIG. 24, when it is determined that the touch input points overlap each other, priority of a color realized at an overlapping point P may be determined.

At the overlapping point P, a cyan color C, which is a mix of colors realized by the first liquid crystal panel 120 and the second liquid crystal panel 130, or a green color G, which is a color that is input later, may be realized. Depending on the embodiment, it will be appreciated that a blue color B, which is a color that is first input, may be realized.

Priority of the color presented at the overlapping point P may be determined according to a predetermined program. Depending on the embodiment, the priority may be determined in a mode that is set by a user. Here, the mode that is set by the user may include a mixed-color input mode, a solid-color display mode, and the like, which have been described above (344).

The control process of the display element 100 according to an embodiment has been described above. For convenience of description, the display element 100 of the mobile device 10 has been described as an example. However, the control method of the display element 100 is not limited thereto, and a note may be implemented in various ways through communication with the flip cover 20.

FIG. 25 shows an example of the method of implementing a note through communication between the mobile device 10 and the flip cover 20.

Referring to FIG. 25, a note displayed on the display element 100 of the mobile device 10 may be displayed on the display element 100*a* of the flip cover 20 according to predetermined conditions.

As an example, when the cover of the flip cover 20 is closed while a note is being written on the display element 100 of the mobile device 10, the note being displayed on the display element 100 of the mobile device 10 may be displayed on the display element 100*a* of the flip cover 20. Here, the note being displayed on the display element 100 may include a written note applied to the display element 100. A display element 100 similar to the display element 100 of the mobile device 10 may also be applied to the flip cover 20, and thus a user may keep writing the note on the display element 100*a* of the flip cover 20.

A process in which the display element 100*a* of the flip cover 20 recognizes a color note is similar to those described with reference to FIGS. 18 to 24. Accordingly, redundant description thereof will be omitted here.

Various modifications of the display element 100 will be described below.

FIG. 26 shows a structure of a display element 100*b* according to another embodiment.

Referring to FIG. 26, the display element 100*b* according to another embodiment may include a first display panel 120 and a second display panel 130, unlike the display element 100 shown in FIG. 4. The electrode structure and the substrate layout are substantially the same as those described with reference to FIG. 4. Accordingly, redundant description thereof will be omitted here, and the following description focuses on differences with the structure of the display element 100 shown in FIG. 4.

Each of the first and second display panels 120 and 130 of the display element 100b according to this embodiment may be a liquid crystal panel to which a cholesteric liquid crystal is applied like that shown in FIG. 4. The following description assumes that liquid crystal panels are provided as the first and second display panels 130 and 140.

The display element 100 according to this embodiment may represent a total of four colors by switching on or off power applied to the first and second liquid crystal panels 120 and 130.

In this embodiment, an example in which the display element 100 includes two liquid crystal panels has been described, but the number of liquid crystal panels is not limited thereto. That is, one liquid crystal panel may be provided, or four or more liquid crystal panels may be provided. As the number of liquid crystal panels increases, the number of representable colors increases.

FIG. 27 shows a mobile device 10c to which a display element 100c is applied according to still another embodiment, FIG. 28 shows a structure of the display element 100c in detail according to still another embodiment, FIG. 29 schematically shows a twisted structure of a blackening material and a cholesteric liquid crystal molecule C applied to a privacy protection layer 105c of the display element 100c according to still another embodiment, and FIG. 30 shows a method in which a texture of the privacy protection layer 105c is switched according to an electric field applied to the privacy protection layer 105c.

Referring to FIG. 27, a mobile device 10c includes a main body, an input unit, and a display element 100c. What has been described about the main body and the input body with reference to FIG. 1 will be omitted.

Referring to FIG. 28, the display element 100c may include a touch panel 110c, a privacy protection layer 105c, a first display panel 120c, a second display panel 130c, and a third display panel 140c.

The first, second, and third display panels 120c, 130c, and 140c, substrates S1 to S6 supporting the display panels, and electrode structures E1 to E6 formed on the substrates are the same as those described with reference to FIG. 4. The following description focuses on differences with FIG. 4.

The display element 100c according to this embodiment may include a privacy protection layer 105c that is provided to limit a viewing angle of the display element 100c when a privacy protection mode is set. Hereinafter, the privacy protection mode is defined as a concept including a viewing angle limiting mode in which the viewing angle of the display element 100c is limited by controlling transmittance of light incident on the display element 100c and a transmission mode in which light is not blocked but transmitted as it is.

A viewing angle is a concept that means an oblique angle at which a normal screen can be seen on a display element. Generally, a liquid crystal display element has a characteristic in which brightness or contrast ratio changes significantly depending on an angle at which the liquid crystal display element is viewed. In this case, an angle at which the contrast ratio is maintained at a specific value or greater may be represented as the viewing angle.

The display element 100c according to this embodiment may include a seventh substrate S7, an eighth substrate S8 placed apart from the seventh substrate S7, a seventh electrode E7 placed on one surface of the seventh substrate S7, and an eighth electrode E8 placed on one surface of the eighth substrate S8. The privacy protection layer 105c may be placed between the seventh electrode E7 and the eighth electrode E8, and the eighth substrate S8 may be attached to the first substrate S1 by means of an OCA adhesive film.

That is, the privacy protection layer 105c may be placed in front of a liquid crystal panel and configured to limit the viewing angle of the display element 100c by controlling transmittance of light incident on the liquid crystal panel. A configuration of the privacy protection layer 105c will be described in detail below.

The privacy protection layer 105c may include cholesteric liquid crystal molecules C and blackening materials B. Referring to FIG. 29, the cholesteric liquid crystal molecules C may be arranged such that the cholesteric liquid crystal molecules C are twisted at regular intervals, and the blackening materials B may be introduced into the twisted structure of the cholesteric liquid crystal molecules C.

In this case, the privacy protection layer 105c may have a characteristic of selectively reflecting light depending on a twisting direction and a repeating structure of the cholesteric liquid crystal molecules C and the blackening materials B and may adjust the characteristic by means of an electric field applied to the privacy protection layer 105c.

More specifically, textures of the cholesteric liquid crystals C and the blackening materials B may be classified into a planar state, a focal conic state, and a homeotropic state, depending on an electric field applied to the privacy protection layer 105c.

Referring to FIG. 30, the privacy protection layer 105c may be present in the planar state, in which light may be reflected while there is no electric field. In this case, the privacy protection layer 105c may be switched to the focal conic state, in which light is transmitted or scattered, by applying an electric field to the privacy protection layer 105c.

Also, when the privacy protection layer 105c is present in the planar state or the focal conic state, the privacy protection layer 105c may be switched to the homeotropic state, in which light may be transmitted, by applying a sufficiently high electric field to the privacy protection layer 105c.

Also, when the privacy protection layer 105c is present in the homeotropic state, the privacy protection layer 105c may be switched to the focal conic state by lowering the electric field applied to the privacy protection layer 105c and may be switched to the planar state by blocking the electric field applied to the privacy protection layer 105c.

Also, while the privacy protection layer 105c is present in the focal conic state, the privacy protection layer 105c may still maintain the focal conic state even when the electric field applied to the privacy protection layer 105c is blocked.

The display element 100c according to still another embodiment will be described in detail below with reference to the accompanying drawings.

FIG. 31 is a control block diagram of the mobile device 10c to which the display element 100c is applied according to still another embodiment, and FIGS. 32 to 36 are diagrams showing examples of a method in which a privacy protection layer of a display element operates by adjusting an electric field applied to the privacy protection layer and an operation result screen.

Referring to FIG. 31, the mobile device 10c may include an input unit 12c and a display element 100c, and the display element 100c may include a memory 170c, a driving unit 180c, a collector 195c, a controller 190c, a privacy protection layer 105c, and liquid crystal panels 120c, 130c, and 140c. FIG. 31 shows an example in which the memory 170c, the collector 195c, and the controller 190c are provided in the display element 100. It will be appreciated that the memory 170c, the collector 195c, and the controller 190c may also be provided in the mobile device 10. In order to distinguish from other elements, the input unit 12 is referred to as a fourth input unit 12c, the memory is referred to as a fourth memory 170c, the driving unit is referred to as a fourth driving unit 180c, the controller is referred to as a fourth controller 190c, and the liquid crystal panel is referred to as a liquid crystal panel C.

The fourth input unit 12c may receive a control command for the display element 100c of the mobile device 10c from a user. In detail, the fourth input unit 12c may receive a command for setting the privacy protection mode of the display element 100c from a user. Details of the fourth input unit 12c that can be understood from what has been described about the first input unit 12 will be omitted here.

The collector 195c may collect ambient information of the mobile device 10c when the privacy protection mode is set.

As an example, the collector 195c may include a gyro sensor.

The gyro sensor may collect rotation information of the mobile device 10c and transfer the collection rotation information to the fourth controller 190c. Generally, the user orients a long axis of the display screen toward a first direction when the mobile device 10c is used. However, the user may orient the long axis of the display screen toward a second direction perpendicular to the first direction depending on the type of content provided by the mobile device 10c.

In this case, the gyro sensor may collect the rotation information of the mobile device 10c and transfer the collected rotation information to the controller, and the controller may adjust a direction in which the privacy protection layer 105c transmits light on the basis of the information transferred from the gyro sensor.

As another example, the collector 195c may include an RF sensor.

The RF sensor may collect an RF signal near the mobile device 10c and transfer the collected RF signal to the fourth controller 190c. When other people approach the user while the user is using the mobile device 10c, there is a need to apply the privacy protection mode. Accordingly, the fourth controller 190c may control the privacy protection layer 105c to operate in a viewing angle adjustment mode only when an RF signal is detected even though the privacy protection mode is running. As a result, only when necessary, the fourth controller 190c may control the privacy protection layer 105c to operate in the viewing angle adjustment mode. The viewing angle adjustment mode is a mode in which the viewing angle of the display element 100c is limited by controlling transmittance of light incident on the privacy protection layer 105 and may refer to an operation mode of the privacy protection layer 105c while the privacy protection mode is operating. As an example, the viewing angle adjustment mode may include alternately forming a light transmission pattern and a light reflection pattern on the privacy protection layer 105c. Meanwhile, it will be appreciated that according to predetermined conditions, the fourth controller 190c may allow the privacy protection mode to be set when an RF signal is detected. The fourth memory 170c may store information regarding a control program for controlling the display element 100c of the mobile device 10c, a dedicated application initially provided by a manufacturer, or a general-purpose application downloaded from the outside.

The fourth memory 170c may store privacy protection mode setting information that is set by a user. Also, the fourth memory 170c may store rotation information of the mobile device 10 that is collected by the gyro sensor or may store information regarding an RF signal near the mobile device 10 that is collected by the RF sensor. Meanwhile, the fourth memory 170c may also store storage information of the above-described first memory 170. Details that can be understood from what has been described about the first memory 170 will be omitted here.

The fourth driving unit 180c may adjust an electric field applied to the privacy protection layer 105c and the liquid crystal panel C. The fourth driving unit 180c may include a driver IC. More specifically, the fourth driving unit 180c may include an X-axis driving unit configured to supply power in an X-axis direction of the privacy protection layer 105c and the liquid crystal panel C and a Y-axis driving unit configured to supply power in a Y-axis direction of the privacy protection layer 105c and the liquid crystal panel C.

The fourth controller 190c may function to control the overall operation of the display element 100c of the mobile device 10c, control signal flow between internal elements of the display element 100c of the mobile device 10c, and process data.

The fourth controller 190c may adjust an electric field applied to the privacy protection layer 105c on the basis of the privacy protection mode setting information and sensor value information received from the collector 195c.

As an example, referring to FIG. 32, when the privacy protection mode is set, the fourth controller 190c may apply an electric field in the X-axis and may apply no electric field in the Y-axis. Here, the X-axis is defined as a short-axis direction of the display screen of the mobile device 10c, and the Y-axis is defined as a long-axis direction of the display screen of the mobile device 10c.

In this case, a light transmission pattern and a light reflection pattern may be alternately formed on the privacy protection layer 105c in the X direction. As a result, it is possible to implement the viewing angle adjustment mode as shown in FIG. 33. The viewing angle adjustment mode as shown in FIG. 33 is hereinafter referred to as a viewing angle adjustment mode X.

When rotation of the mobile device 10c is detected by the gyro sensor while the privacy protection layer 105c is operating in the viewing angle adjustment mode X, the fourth controller 190c may adjust a direction in which the privacy protection layer 105c transmits light on the basis of the sensor value information transferred from the gyro sensor.

As an example, referring to FIG. 34, when rotation of the mobile device 10c is detected by the gyro sensor, the fourth controller 190c may perform a control operation to switch on or off power supplied from the fourth driving unit 180c. In detail, the fourth controller 190c may perform a control operation to block an electric field applied in the X-axis and apply an electric field in the Y-axis.

In this case, a light transmission pattern and a light reflection pattern may be alternately formed on the privacy protection layer 105c in the X direction. As a result, it is possible to implement the viewing angle adjustment mode as shown in FIG. 35. The viewing angle adjustment mode as shown in FIG. 34 is hereinafter referred to as a viewing angle adjustment mode Y.

Depending on the embodiment, the direction rotation process for the viewing angle adjustment mode based on the gyro sensor may be performed on the assumption that an RF signal is collected by the RF sensor.

More specifically, depending on the user's setting, the privacy protection mode may be executed on the assumption that an RF signal is collected by the RF sensor. That is, only when an RF signal is transferred from the RF sensor, the controller 190c may control a direction for the viewing angle adjustment mode on the basis of the sensor value information collected by the gyro sensor. However, the method in which the fourth controller 190c controls the viewing angle adjustment mode is not limited to the above-described example.

Meanwhile, when the privacy protection mode is not set, the fourth controller 190c may perform a control operation to apply an electric field in the X direction and Y direction as shown in FIG. 36.

In this case, the privacy protection layer 105c may operate in the transmission mode. As a result, a display screen of a panel placed on a rear surface of the privacy protection layer 105c, for example, the liquid crystal panel C may be placed as it is without a separate light blocking process.

FIG. 37 is a flowchart showing an example of a control method of the display element 100c according to still another embodiment, FIG. 38 shows another example of a control method of the display element 100c according to still another embodiment, FIG. 39 shows still another example of a control method of the display element 100c according to still another embodiment, and FIGS. 40 and 41 illustrate the control method of FIG. 39.

First, the control method of the display element 100c shown in FIG. 37 will be described.

Referring to FIG. 37, first, the control method of the display element 100c according to still another embodiment assumes that power of the mobile device 10c is switched on (346).

When the power of the mobile device 10c is switched on, whether to set the privacy protection mode or not may be checked. As described above, the privacy protection mode may be set through the fourth input unit 12c of the mobile device 10c (348).

When the privacy protection mode is set, the privacy protection layer 105c may operate in the viewing angle adjustment mode. As an example, the fourth controller 190c may perform a control operation to apply an electric field in the X direction of the display element 100c and may perform a control operation to block an electric field in the Y direction so that the privacy protection layer 105c operates in the viewing angle adjustment mode X (350).

Meanwhile, when the privacy protection mode is not set, the privacy protection layer 105c may operate in the transmission mode. As an example, the fourth controller 190c may allow the privacy protection layer 105c to operate in the transmission mode by performing a control operation to apply an electric field in the X-axis direction and the Y-axis direction of the display element 100c (352).

Next, the control method of the display element 100c shown in FIG. 38 will be described.

Operations 346 to 352 of the control method of the display element 100c shown in FIG. 38 are substantially the same as those described with reference to FIG. 37. Thus, the following description focuses on differences with FIG. 37.

The control method of the display element 100c shown in FIG. 38 may further include an operation of collecting rotation information of the mobile device 10c by means of the gyro sensor (354) and operations of performing a control operation to rotate the viewing adjustment mode when rotation of the mobile device 10c is detected (355 and 356).

When rotation information of the mobile device 10c is collected, the gyro sensor may output collected sensor value information to the fourth controller 190c (354).

When it is determined that the mobile device 10c is rotated on the basis of the sensor value information of the gyro sensor, the fourth controller 190c may perform a control operation so that the viewing angle adjustment mode also rotates (355 and 356).

Meanwhile, when it is determined that the mobile device 10c does not rotate, the fourth controller 190c may perform a control operation to maintain the viewing angle adjustment mode (350).

Next, the control method of the display element 100c shown in FIG. 39 will be described.

Operations 346, 348, and 352 of the control method of the display element 100c shown in FIG. 39 are substantially the same as those described with reference to FIG. 37. Thus, the following description focuses on differences with FIG. 37.

The control method of the display element 100c shown in FIG. 39 may include collecting an RF signal by means of the RF sensor when it is determined that the privacy protection mode is set.

When a result of collecting an RF signal by means of the RF sensor is that no RF signal is detected, the privacy protection layer 105c may operate in the transmission mode (360 and 361).

On the contrary, when the RF signal is detected, the privacy protection layer 105c may operate in the viewing angle adjustment mode (362).

For example, as shown in FIG. 40, when any person approaches the mobile device 10c, the RF signal may be detected. In this case, the privacy protection layer 105c of the display element 100c may be switched to the viewing angle adjustment mode.

Subsequently, as shown in FIG. 41, when the person moves farther away from the mobile device 10c, the RF signal may be no longer detected. In this case, the privacy protection layer 105c of the display element 100c may be switched back to the transmission mode.

Various embodiments of the display elements 100, 100a, 100b, and 100c have been described above. The aforementioned display elements 100, 100a, 100b, and 100c are common in that they have display panels implemented in the form of a liquid crystal panel.

Depending on the embodiment, a panel other than the liquid crystal panel may be used as the display panels of the display elements. According to an embodiment, an electrochromic panel may be used as the display panel.

An embodiment in which the display panel is provided in the form of an electrochromic panel will be described in detail below. In order to distinguish from the above-described embodiments, the display panel is referred to as an electrochromic panel.

FIG. 42 shows an example of a display element 100d having a display panel provided in the form of an electrochromic panel, and FIG. 43 shows a modification of a display element 100e having a display panel provided in the form of an electrochromic panel.

Referring to FIG. 42, the display element 100d may include a touch panel 110d, a first electrochromic panel 120d, a second electrochromic panel 130d, and a third electrochromic panel 140d. An electrode structure and a substrate layout of the display element 100d according to this embodiment are substantially the same as those described with reference to FIG. 4. Accordingly, redundant description thereof will be omitted here, and the following description focuses on differences with the structure of the display element 100 shown in FIG. 4.

The first to third electrochromic panels 120d, 130d, and 140d of the display element 100d according this embodiment may include electrochromic layers 120-1d, 130-1d, and 140-1d each including an organic electrochromic material and electrolyte layers 120-2d, 130-2d, and 140-2d placed adjacent to the electrochromic layers.

The organic electrochromic material provided in each of the electrochromic layers 120-1d, 130-1d, and 140-1d may be one organic material that is discolored upon deoxidization by means of one electrochromic device. As an example, the organic electrochromic material may include a viologen-based material.

A backbone of the viologen-based material may be expressed using Chemical Formula 1.

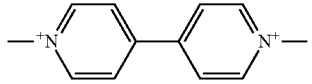

[Chemical Formula 1]

The viologen-based material may adjust a realized color by changing a backbone structure shown in Chemical Formula 1 or a functional group bonded to the backbone.

The viologen-based material may represent a blue color B when the viologen-based material is deoxidized due to electrons supplied thereto and may represent a transparent color when the viologen-based material is oxidized due to electrons removed therefrom. Further, the viologen-based material may be stably maintained while the viologen-based material is deoxidized or oxidized. That is, even when power is shut off, the viologen-based material may be stably maintained due to a memory effect, thus reducing power consumption.

The electrolyte layers 120-2d, 130-2d, and 140-2d are layers for supplying ions to the electrochromic layers and may be formed of an electrolyte material such as propylene carbonate, lithium bis(trifluoromethanesulfonyl)imide (LiTFSI), or the like. However, examples of the electrolyte material are not limited thereto.

In this embodiment, an example in which the display element 100d includes three electrochromic layers has been described, but the number of electrochromic layers is not limited thereto. That is, one electrochromic layer may be provided as shown in FIG. 43, and two, four or more electrochromic layers may be provided depending on the embodiment. When different types of electrochromic materials are provided in different electrochromic layers, the number of representable colors may increase as the number of electrochromic panels increases.

Next, an operating principle of a mobile device to which the display element 100d is applied according to this embodiment will be described in detail with reference to the accompanying drawings.

FIG. 44 is a flowchart showing a control process of the display element 100d shown in FIG. 42, and FIGS. 45 to 47 additionally illustrate the flowchart of FIG. 44. For convenience of description, the following description will focus on the structure of the display element 100d shown in FIG. 42.

Referring to FIG. 44, the control process of the display element 100d according to this embodiment may include setting a color input mode of the display element 100 (364 and 370), controlling power applied to an electrochromic panel (366 and 374), and receiving a touch input from an external input means 200 (368 and 372).

More specifically, the setting of a color input mode may include setting a first color input mode.

The first color input mode may be set through the external input means 200 and then transferred to the mobile device 10 or may be set through an application of the mobile device 10.

Details of the first color input mode that can be understood from what has been described will be omitted here (364).

When the color input mode is set, power may be applied to the electrochromic panel.

This operation is for preparing for reception of a touch input. Referring to FIG. 45, power may be applied to the first, second, and third electrochromic panels (366).

Subsequently, a touch input may be received from the external input means 200, and also a point where the touch input is received may be recognized.

The first controller may recognize the touch input point by collecting capacitance change information of the touch input point on the touch panel 110d and detecting coordinates of the touch input point or may recognize the touch input point on the basis of sensor value information collected by a separate position sensor.

Depending on the embodiment, information regarding the recognition of the touch input point (hereinafter also referred to as touch input point recognition information) in this operation may be stored in the memory.

When the touch input point is recognized, the controller may switch on power applied to a corresponding point of the first electrochromic panel 120d. In this case, an organic electrochromic material provided at the corresponding point of the first electrochromic panel 120d is deoxidized so that a note with a first color may be written.

FIG. 46 shows an example of a touch input in the first color input mode.

When the display element 100d of the mobile device 10 receives a touch input from the external input means 200, a point where the touch input is received may be recognized by the above-described process. As shown in FIG. 46B, power may be applied to a corresponding point of the first electrochromic panel 120d.

In this case, an organic electrochromic material provided at the corresponding point of the first electrochromic panel 120d may be deoxidized, and the note with the first color may be written as shown in FIG. 46A.

Depending on the embodiment, when a user desires to change a color of the touch input, a second color input mode may be set (370).

When the second input mode is set, a touch input may be received from the external input means 200, and also a point where the touch input is received may be recognized.

When the touch input point is recognized, power may be applied to a corresponding point of the second electrochromic panel 130d.

FIG. 47 shows an example of a touch input in the second color input mode.

When the display element 100d of the mobile device 10 receives a touch input from the external input means 200, a point where the touch input is received may be recognized by the above-described process. As shown in FIG. 47B, power may be applied to a corresponding point of the second electrochromic panel 130d.

In this case, an organic electrochromic material provided at the corresponding point of the second electrochromic panel 130d may be deoxidized, and a note with a second color may be written as shown in FIG. 47A.

Since the electrochromic panel of the display element 100d according to this embodiment has bistability as described above, the power applied to the first electrochromic panel 120d in operation 368 may be switched off.

When a note is written in the second color input mode, whether the touch input point in the first color input mode overlaps the touch input point in the second color input mode may be determined (376).

As shown in FIG. 47, when it is determined that the touch input points do not overlap each other, the procedure may end.

Depending on the embodiment, when it is determined that the touch input points overlap each other, priority of a color realized at an overlapping point may be determined. Details of this operation that can be understood from what has been described in operation 344 of FIG. 19 and with reference to FIG. 24 will be omitted here.

Various embodiments of an electronic apparatus and a control method thereof have been described above. It is to be understood that the technical spirit of the present invention is not limited to the above-described embodiments, but should be broadly construed as a concept including modifications within a range that can be readily implemented by those skilled in the art.

The invention claimed is:

1. An electronic apparatus comprising:
a touch panel;
a first display panel placed adjacent to a privacy protection layer and provided to reflect light of a first predetermined wavelength region among light incident on a touch input point when a touch input is received;
a second display panel placed adjacent to a surface of the first display panel facing away from the privacy protection layer and provided to reflect light of a second predetermined wavelength region among light incident on a touch input point when a touch input is received;
a communicator configured to receive color information to be applied to the first display panel and the second display panel; and
a controller configured to control power applied to the first display panel and the second display panel based on the color information received by the communicator,
wherein the privacy protection layer includes cholesteric liquid crystal molecules and blackening materials,
wherein the cholesteric liquid crystal molecules are arranged such that the cholesteric liquid crystal molecules are twisted at regular intervals, and the blackening materials are introduced into the twisted structure of the cholesteric liquid crystal molecules.

2. The electronic apparatus of claim 1,
wherein the first display panel is provided to reflect the light of the first predetermined wavelength region among the light incident on the touch input point when the touch input is received while power is off, and
wherein the second display panel is provided to reflect the light of the second predetermined wavelength region among the light incident on the touch input point when the touch input is received while power is off.

3. The electronic apparatus of claim 1,
wherein the first display panel includes a cholesteric liquid crystal placed with a first predetermined helical pitch while power is off,
wherein the second display panel includes a cholesteric liquid crystal placed with a second predetermined helical pitch while power is off, and
wherein the first display panel and the second display panel are placed such that the cholesteric liquid crystals transmit light incident on the first display panel and the second display panel when power is on.

4. The electronic apparatus of claim 1, further comprising:
a memory configured to store information regarding the touch input point received from an external input,
wherein when a first color input mode is set, the controller performs a control operation to switch off power applied to the first display panel and switch on power applied to the second display panel, and
wherein when a second color input mode is set, the controller performs a control operation to switch on power applied to portions of the first display panel other than the touch input point and switch off power applied to the second display panel on the basis of the information stored in the memory.

5. The electronic apparatus of claim 4, wherein when a touch input point in the first color input mode overlaps a touch input point in the second color input mode, the controller determines whether a mix of a first color and a second color is realized at an overlapping point or the second color is realized at the overlapping point.

6. The electronic apparatus of claim 1,
wherein the display panel comprises:
an electrochromic layer including an organic electrochromic material provided to represent a color during deoxidization and switch into a transparent mode during oxidization; and
an electrolyte layer placed adjacent to the electrochromic layer, and
wherein when the touch input is received by the touch panel, the controller performs a control operation to supply power to a point of the electrochromic layer corresponding to the touch input point.

7. The electronic apparatus of claim 6, further comprising a memory configured to store information regarding the touch input point received by the touch panel,
wherein when a first color input mode is set, the controller performs a control operation to switch on power applied to a point of the first display panel corresponding to a point where the touch input is received and maintain power applied to the second display panel in an off state based on the information stored in the memory, and
wherein when a second color input mode is set, the controller performs a control operation to switch on power applied to a point of the second display panel corresponding to the point where touch input is received and maintain power applied to the first display panel in an off state based on the information stored in the memory.

8. The electronic apparatus of claim 7, wherein when a touch input point in the first color input mode overlaps a touch input point in the second color input mode, the controller determines whether a mix of a first color and a second color is realized at an overlapping point or the second color is realized at the overlapping point.

9. The electronic apparatus of claim 1, further comprising a privacy protection layer placed adjacent to the touch panel and switched to a viewing angle adjustment mode due to a change in arrangement of a cholesteric liquid crystal and a blackening material when a privacy protection mode is set,
wherein the controller controls power applied to the privacy protection layer when a predetermined condition is satisfied.

10. The electronic apparatus of claim 9, wherein the viewing angle adjustment mode is a mode in which a light transmission pattern and a light reflection pattern are alternately formed on the privacy protection layer.

11. A method of controlling an electronic apparatus including a first display panel provided to reflect light of a first predetermined wavelength region among light incident on a touch input point when a touch input is received and a second display panel provided to reflect light of a second predetermined wavelength region among light incident on a touch input point when a touch input is received, the method comprising:

setting a color input mode of the electronic apparatus;

switching off power applied to any one of the first display panel and the second display panel according to the color input mode and switching on power applied to the other panel; and receiving a touch input, wherein the electronic apparatus further includes a privacy protection layer including cholesteric liquid crystal molecules and blackening materials and configured to switch to a viewing angle adjustment mode according to power applied thereto, and wherein the method further comprises switching the privacy protection layer to the viewing angle adjustment mode when a privacy protection mode is set.

12. The method of claim 11, further comprising storing information regarding the touch input point in a memory, wherein the switching off of power applied to any one of the first display panel and the second display panel according to the color input mode and the switching-on of power applied to the other panel comprises:

switching off power applied to the first display panel and switching on power applied to the second display panel when a first color input mode is set; and switching on power applied to portions of the first display panel other than the touch input point and switching off power applied to the second display panel based on the information stored in the memory when a second color input mode is set.

13. The method of claim 12, further comprising, when a touch input point in the first color input mode overlaps a touch input point in the second color input mode, determining whether a mix of a first color and a second color is realized at an overlapping point or the second color is realized at the overlapping point.

14. The method of claim 11, wherein the electronic apparatus further includes a privacy protection layer configured to switch to a viewing angle adjustment mode according to power applied thereto, and wherein the method further comprises switching the privacy protection layer to the viewing angle adjustment mode when a privacy protection mode is set.

15. The method of claim 11, further comprising at least one of:

collecting rotation information of the electronic apparatus by means of a gyro sensor provided in the electronic apparatus and rotating a viewing angle adjustment mode direction of the privacy protection layer on the basis of the rotation information of the electronic apparatus when rotation of the electronic apparatus is detected; and collecting an RF signal near the electronic apparatus from an RF sensor provided in the electronic apparatus and switching the privacy protection layer to the viewing angle adjustment mode when an RF signal is detected near the electronic apparatus.

* * * * *